(12) United States Patent
Powers et al.

(10) Patent No.: US 10,339,716 B1
(45) Date of Patent: Jul. 2, 2019

(54) SYSTEM AND METHOD FOR DENSE, LARGE SCALE SCENE RECONSTRUCTION

(71) Applicant: Occipital, Inc., Boulder, CO (US)

(72) Inventors: Jeffrey Powers, San Francisco, CA (US); Nicolas Burrus, Madrid (ES); Yuping Lin, Boulder, CO (US); Paul Schroeder, Boulder, CO (US)

(73) Assignee: Occipital, Inc., Boulder, CO (US)

( * ) Notice: Subject to any disclaimer, the term of this patent is extended or adjusted under 35 U.S.C. 154(b) by 2 days.

(21) Appl. No.: 15/708,649

(22) Filed: Sep. 19, 2017

Related U.S. Application Data

(60) Provisional application No. 62/396,647, filed on Sep. 19, 2016.

(51) Int. Cl.
G06T 7/80 (2017.01)
G06T 19/00 (2011.01)
G06T 7/536 (2017.01)
G06T 15/20 (2011.01)
G06T 17/20 (2006.01)

(52) U.S. Cl.
CPC ............ *G06T 19/006* (2013.01); *G06T 7/536* (2017.01); *G06T 7/85* (2017.01); *G06T 15/205* (2013.01); *G06T 17/20* (2013.01); *G06T 2215/16* (2013.01)

(58) Field of Classification Search
None
See application file for complete search history.

(56) References Cited

U.S. PATENT DOCUMENTS

| 2014/0003705 | A1* | 1/2014 | Taguchi | G06T 7/344 382/154 |
| 2014/0139639 | A1* | 5/2014 | Wagner | G06T 17/00 348/46 |
| 2015/0262412 | A1* | 9/2015 | Gruber | G06T 15/50 345/426 |

* cited by examiner

Primary Examiner — Mark Roz
(74) Attorney, Agent, or Firm — Lee & Hayes, P.C.

(57) ABSTRACT

A system configured to improve the operations associated with generating virtual representations on limited resources of a mobile device. In some cases, the system may utilize viewpoint bundles that include collection of image data with an associated pose in relative physical proximity to each other to render a virtual scene. In other cases, the system may utilize 2.5D manifolds including 2D image data and a weighted depth value to render the 3D environment.

20 Claims, 19 Drawing Sheets

```
1900 ─┐
      ↘

// Spurious check: If "background" obsreved
function bool spuriousCheck(m_i, S_k):
        Compute dm_k = depth of S_k projected to the input depth frame
        If dm_k < m_i.MinLiveDepth:
                Return True
        Else Return False // K is the max number of surfaces
Struct ManifoldPixel {
        Float DepthValues[K]
        Float Weights[K]
        Float MinInputDepth }

Manifold = 2D image of ManifoldPixel  // Reset the min observed depth
For each manifold pixel m_i m_i.MinInputDepth = FLOAT_MAX candidateSpuriousManifoldPixels = [] (a unique set) // Try to update each pixel from the
input depth frame
For each depth pixel d_i of the input depth frame:
        Project into the manifold 2D space to retrieve pixel m_i
                Existed = False
        // Mark the manifold pixels that will need spurious filter
        For each surface S_k in m_i:
                If d_i is compatible with m_i.DepthValues[k]:
                        Update m_i.DepthValues[K] and m_i.Weights[K]
                        Existed = True
                        If there is more than 1 used S_k in m_i: // existing surface(s)
                        If any surfaces are used in m_i: // this depth pixel
                                candidateSpuriousManifoldPixels.append (m_i)
                m_i.MinInputDepth = min(m_i.MinInputDepth, d_i)

// Could not find an existing surface compatible with input depth
        If !Existed:
                If any surfaces are used in m_i:
                        // We have existing surface(s) that didn't agree with
                        // this depth pixel. So, they may be spurious.
                        candidateSpuriousManifoldPixels.append (m_i)
                If All surfaces are used in m_i: // Try to find a slot for this new depth
                        Find S_k the smallest weighted surface
                        If m_i.Weights[S_k] < weight_threshold, then remove it
                S_free = first index of empty surface in m_i
                If S_free is valid:
                        Initialize S_free with d_i For each updated manifold pixel m_i in candidateSpuriousManifoldPixels:
        For each surface S_k in m_i:
                if spuriousCheck(m_i, S_k) = True:
                        Decrease the weight of m_i.Weights[S_k]

// Optional: Perform spurious suppression in parallel
scheduled_reductions_list = []
While looping over each pixel d_i (as above):
After each m_i is updated (including m_i.MinInputDepth):
        Perform spuriousCheck(..) for each surface S_k of m_i:
                If supriousCheck(..) is false, but is scheduled
                    for weight reduction, cancel the scheduled reduction by
                    deleting {m_i, S_k} from scheduled_reductions_list.
                Else, if S_k does meet the spurious check, and there is no
                    scheduled weight reduction, schedule { m_i, S_k } at index N (the first
                    open index) in scheduled_reductions_list.
                    //(For efficiency, mark S_k as scheduled
For each scheduled (and non-canceled) reduction of S_k in m_i:
Decrease the weight of m_i.Weights[S_k]
```

FIG. 19

SYSTEM AND METHOD FOR DENSE, LARGE SCALE SCENE RECONSTRUCTION

CROSS-REFERENCE TO RELATED APPLICATION(S)

This application claims priority to U.S. Provisional Application No. 62/396,647 filed on Sep. 19, 2016 and entitled "Large Scale SLAM on Mobile," which is incorporated herein by reference in its entirety.

BACKGROUND

The presence of three-dimensional (3D) imaging systems, mixed reality systems, and 3D representations of real physical environments are becoming more and more commonplace. In some cases, it is also commonplace for users of the 3D image or mixed reality systems to revisit physical environments or scene on more than one occasion. In these cases, the system may have to rebuild the virtual environment or relocate the individual within the virtual environment, both of which can be computationally intensive and difficult to achieve in substantially real-time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 19 is an example pseudocode associated with updating K-depth manifold according to some implementations.

DETAILED DESCRIPTION

Figure 1:
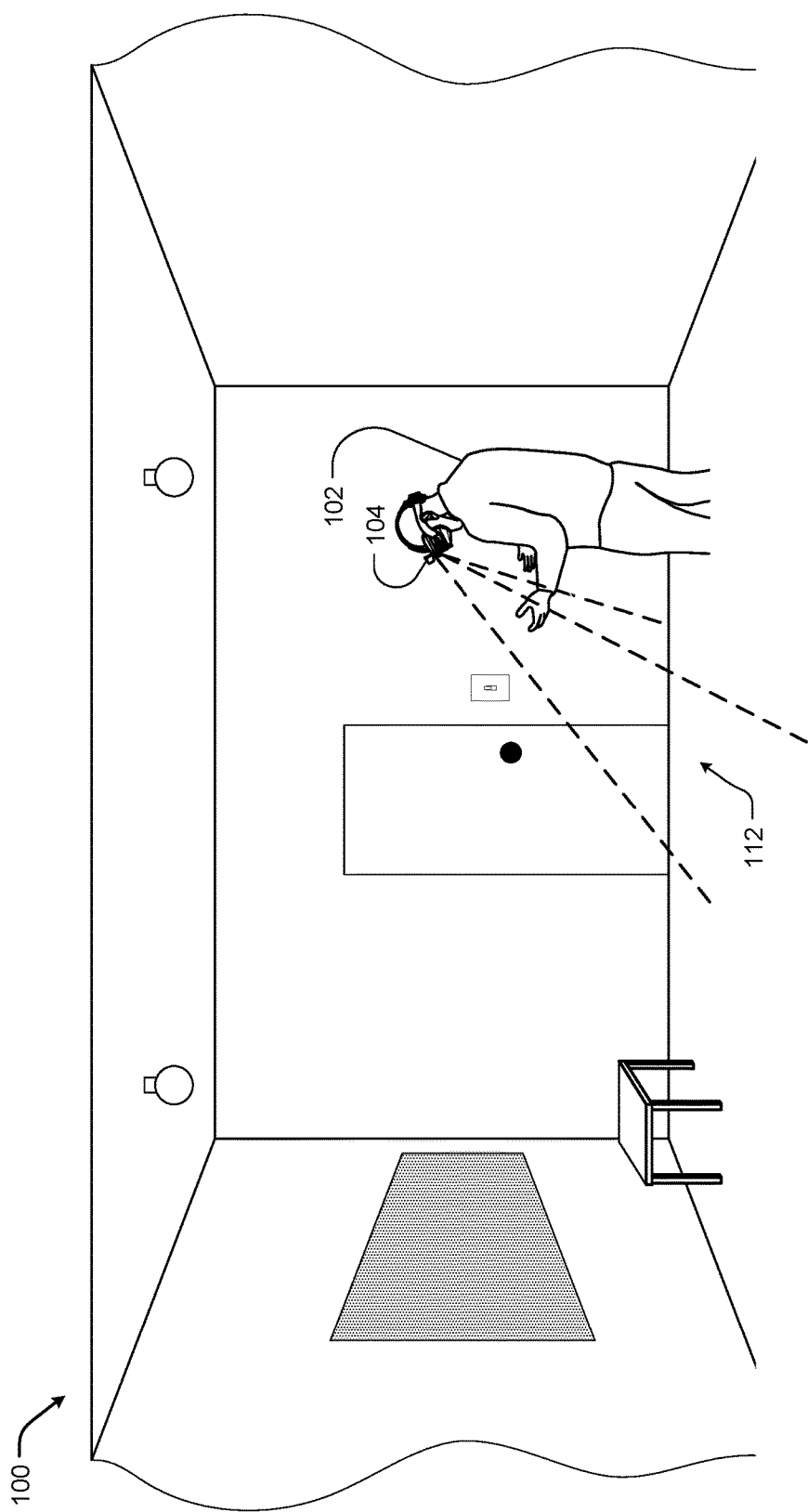
FIG. 1 illustrates an example physical environment including a user of a spatial interaction system according to some implementations.

This disclosure includes techniques and implementations for improved real-time capturing of a three-dimensional (3D) environment with respect to a spatial interaction system. For example, a user may capture image data associated with a home or another physical environment using a mobile electronic device, for instance, a tablet, a smart phone, notebook computer, interactive headset, virtual reality system, or other image capture device. In some cases, the mobile device may be equipped with image components capable of capturing image data and/or depth data associated with the physical environment. The captured image data may be utilized by a spatial interaction system, such as a remote image system, an application associated with the mobile device, or a combination thereof, to generate the 3D model, 3D textured model, or mesh of the physical environment as well as to place or orientate features (e.g., objects, boundaries, portions of objects, object intersections, such as corners of a wall, textures, etc.) and the user within a 3D virtual representation of the physical environment.

Unlike conventional systems that typically rely on multiple external imaging devices positioned in the physical environment to capture images of physical objects from multiple angles, the image component associated with the image system described herein may be approximate to or adjacent to the mobile device, such that the captured images are from substantially the user's perspective and/or the perspective of the mobile device. In one specific example, the image components may be incorporated into the mobile device itself in a manner that the mobile device is a self-contained unit. Thus, unlike the conventional system which restricts the user to a predefined area or space equipped with the external image devices, the system or devices described herein allow the user to move from physical environment to physical environment without additional setup, interrupting the virtual experience or loss of the ability to interact with the physical objects.

However, since the user is able to move about the physical environment unbounded by an area defined by the external image devices, the virtual environment can quickly become quite large, thereby overwhelming the processing resources (e.g., processors, control units, and memories) of many mobiles devices available today when utilizing standard simultaneous localization and mapping (SLAM) techniques. For example, in standard SLAM techniques generate a continuous grid or mesh formed by a plurality of voxels (e.g., a single sample or data point on a 3D grid). Eventually, the data associated with the mesh becomes too large to process efficiently given the resources on the mobile device or becomes too large to be stored in the temporary or read-write memory of the mobile device.

In some examples, the system described herein, is configured to model a physical space as a 3D virtual environment using a collection of viewpoint bundles. Each viewpoint bundle may include a collection of viewpoints. Each viewpoint may include depth image data represented as voxels, color image data, and a pose (e.g., position, orientation, and direction of view, etc.) of the mobile device at the time the image data was captured. In one example, the viewpoints may be accumulated together as a volume of voxels using a Truncated Signed Distance Function (TSDF) that accumulates information about the scene geometry over time (e.g., over viewpoints). In some cases, each viewpoint bundle may store a full 3D map rather than just the triangular mesh of the virtual scene.

In some implementations, the system may be configured to store an integration viewpoint bundle (e.g., the active viewpoint bundle that captured image data is being integrated with). At various times, the system may be configured to swap the integration viewpoint bundle within the memory of the mobile device to allow the system to render a continuous 3D scene without overwhelming the limited resources of the mobile device. In some cases, the volume generated by the TSDF function and associated with each viewpoint bundle may be based on or include a viewpoint bundle pose. The viewpoint bundle pose may correspond to the pose of the mobile device at the time the first image incorporated into the viewpoint bundle was captured. In some cases, the system may cause the integration viewpoint bundle to be swapped in memory or a new viewpoint bundle to be created based on a distance of a current pose of the mobile to the integration viewpoint bundle pose. In this way, each viewpoint bundle may represent a portion of a scene or environment that may be updated and rendered in substantially real-time by the limited resources of the mobile device.

In some implementations, the system may maintain or estimate a position of the mobile device (e.g., pose of the mobile device) over a limited period of time and a limited amount of space. For example, the system may swap or switch the integration viewpoint bundle when the system determines the compute distance between the translation and the rotation of the current camera pose and the integration viewpoint bundle pose exceed a distance threshold. In some cases, if no viewpoint bundle exists within range of the current mobile device pose, the system may begin generating a new viewpoint bundle using the current mobile device pose as the viewpoint bundle pose. In addition to or in alternative of a distance threshold, the system may implement a time threshold to cause a new viewpoint bundle to be loaded into memory or the integration viewpoint bundle to be evaluated (for instance based on distance or drift error). In still other examples, drift or error thresholds may be set and the system may monitor the accuracy of the mobile device pose estimation and change the integration viewpoint bundle if the accuracy estimate falls below the error threshold.

Since the system described herein, represents the virtual scene or environment as a plurality of viewpoint bundles rather than a continuous mesh, the system may be configured to quickly update a TSDF volume as well as to close loops or connect viewpoint bundles based on physical proximity. For example, the system may be configured to combine or subtract viewpoint bundles directly within the TSDF space. In other cases, the system may allow the user to disable integration (e.g., the user can explore the virtual environment without capturing additional depth data that allows the system to update). In this example, the system may re-localize using the viewpoint bundle data and the image data, such as the depth data and/or the image data.

In one example, the system may update a tracking TSDF volume (e.g., the active or visible TSDF volume) by iterating over the pixels of each depth frame received and updating the corresponding voxel blocks of the TSDF volume with the depth data. For example, the system may perform volume change detection using a synthetic rendering of the model of the virtual scene and comparing the synthetic rendering to a live depth frame to detect voxels of the tracking TSDF requiring volume change. The system may update the detected voxels and ignore the non-detected voxels. By only updating voxels that indicate a volume change opposed to the standard approach of projecting each voxel onto a depth frame, the system may operate on devices having far fewer processing resources than traditional SLAM systems. In some cases, when updating an individual viewpoint bundle, the system may compute a TSDF/weight change of the voxels. The weight change for each voxel may then be applied to the tracking.

In some cases, instead of updating the tracking TSDF volume for each depth frame, the system may be configured to maintain a manifold of 2.5D data and the manifold may be used to update the tracking TSDF volume. In this manner the processing time and resources associated with updating a TSDF volume may be reduced as the process is performed one time using the manifold opposed to for each depth frame captured. In some cases, a manifold is a frame that will store the results of fusing multiple depth frames into a single frame. For example, a manifold may contain a pose, such as a six degrees of freedom (6DOF), set to an initial incoming depth frame in the manner that a viewpoint bundle pose is set. The pose of the manifold represents the projective center of the depth points in the initial depth frame, and a set of camera intrinsics which are utilized to describe or represent a projective behavior of values in the depth frame (e.g., conditions associated with the capture of the depth frame). 3D points may then be determined from the manifold by de-projecting depth points and applying the manifold pose to each of the de-projected depth points, thereby rendering a 3D environment.

In some cases, manifolds may be associated with viewpoint bundles and initialized at the start of scanning and reinitialized at regular intervals (i.e. once every n frames or upon a detected change in mobile device pose). When manifolds are initialized the pose of the manifold is set to match the pose of the incoming depth frame (e.g., the current mobile device pose). The manifold's intrinsics may be fixed or hardcoded, set to match the incoming depth frame's intrinsics, or calculated from the incoming depth frame's intrinsics.

During operations, depth frames are integrated into the manifold in response to the system performing tracking. For example, the system may provide a pose of the mobile device along with each incoming depth frame. The depth values in the incoming depth frame are then de-projected using the intrinsics, warped using the relative pose between the current location of the mobile device and the pose of the manifold, projected into the manifold using the manifold's intrinsics, and finally, used to update the weights and values of the manifold. Integration of incoming depth frames into a manifold is a faster operation than integrating depth frames into a TSDF of comparable resolution. Thus, manifold updating is able to operate in-line with tracking operations opposed to operating as a background task on a separate thread like TSDF.

In some cases, such as in response to a large change in pose, the manifold may be reset and the manifolds depth and weight values may be flushed or integrated with the tracking TSDF. Since a manifold weight at a given pixel value increases with each depth observation, the weight at each pixel value may be used to represent a confidence in each of the depth values in the manifold (e.g., how accurate each depth value is of the actual depth in the physical environment). As such, the weights may be used to inform the TSDF integration process of which manifold depth values are of high confidence and the TSDF weights and values can be changed to reflect that confidence.

In some examples, the manifold may be utilized as a reference data for pose tracking. For instance, in some implementations, the systems may perform tracking by finding a pose which aligns with incoming depth data based on depth data of a reference model (e.g., the TSDF). In order to use the TSDF as a reference model, the system may maintain or update a TSDF mesh by integrating new data as the data is captured. However, the TSDF integration is a slow background operation, and as a result TSDF meshes used for tracking are often several frames older than the incoming depth frame, and can result in the introduction of error into the 3D environment. For example, if the user moves quickly, existing TSDF meshes may be out of view before the TSDF mesh is updated or usable for tracking. However, manifolds are updated every frame and, thus, contain more up to date information than the TSDF mesh. Further, the manifolds are not meshed each time the manifold is updated, but rather may be sent to a GPU as a texture and rendered by using texture values to perturb a flat, constant mesh in a manner similar to height or displacement mapping. As an example, a static triangle mesh can be created once by connecting every pixel in the image grid with its neighbors, and the geometry can be adjusted very efficiently after each update by uploading the manifold depth to the GPU as a texture, adjusting the position of the vertices directly in the vertex shader. This operation may be performed for every frame. The result is that the rendered reference data from a manifold is one from behind the incoming depth data and the tracking may be maintained even when the user moves quickly through a physical environment.

In some implementations, to provide a smoother user experience, two manifolds may be used and updated as image data is captured. For instance, the two manifolds may be used in a ping pong style in which one manifold is integrated with the TSDF mesh and the other is rendering the scene. Thus, the depth values of one manifold is being exported to the TSDF and the other manifold is receiving depth frames for integration. In some cases, the older manifold (e.g., the rendering manifold) continues receiving depth frames for integration and is rendered for a short period of overlap with the younger manifold. The overlapping of the manifolds provides visual continuity to the user.

In some implementations, to enable combination and/or subtraction of viewpoint bundles, each viewpoint bundle may be represented as an unbounded TSDF volume. The unbounded TSDF volume may be partitioned into units called voxel blocks, each formed by a plurality of voxels. For example, the voxel block may be formed as a 4×4×4 volume of voxels. In the current example, each voxel block may be fused with a depth frame and allocated only when the corresponding physical space is observed (e.g., detected within a depth map of the physical environment). Each voxel block may then be indexed using hashing to improve lookup time. In addition, each voxel block may also store indices pointing to the neighbor voxel blocks to achieve faster access to neighbor voxel blocks, which results in improved performance during meshing described below.

In some particular implementations, the size of a voxel block may vary based on the distance from the current pose of the mobile device. For example, as the distance from the pose of the mobile device to a surface in the 3D scene grows, the resolution associated with the surface is decreased thereby reducing the detail of the surface within the scene. Thus, the further the surface is from the current pose of the mobile device, the less detail of the surface may be stored in memory. As such in this implementation, the system may use two-level, three-level, or four-plus-level of voxel block size to reduce the amount of detail maintained in memory as the distance from the pose of the mobile device is increased. For example, the voxel block size may vary from 1×1×1 to 16×16×16. In another example, the voxel blocks may be organized in three levels having a voxel block size of 1×1×1, 2×2×2, and 4×4×4.

In some cases, the tracking TSDF volume may be utilized to update a global mesh (e.g., the voxel blocks of a TSDF volume may be added to the global mesh to generate a complete 3D model of the physical environment that for instance may be utilized later). For instance, each voxel block may be configured to store a sub-mesh which is determined from the voxel TSDF using a marching cubes technique. In this example, multiple sub-meshes (from multiple voxel blocks) are merged into a global mesh (e.g., the global mesh). In this example, when scanning (e.g., capturing image data of the physical environment), the system may re-mesh the voxel blocks that underwent a TSDF update. Thus, the meshing time is prevented from expanding linearly (as is common in conventional SLAM approaches) as the total number of voxel blocks within the tracking TSDF are increased and the update process does not expand beyond the capabilities of the processing resources of the mobile device.

In the current example, the system may perform marching cubes using the voxel blocks by creating a vertex on an edge between two adjacent voxels (with different signs), either in x, y or z direction. In some cases, when the system generates a face having three vertices on three different edges (e.g., in the x, y, and z direction), the face with indices to the edges is stored. If the edge belongs to the neighbor voxel block, the vertex that resides on the edge is not created (as the neighbor voxel block will generate the edge). In some cases, to prevent creating and discarding faces, the system exploit the fact that a scene of a physical environment is primary static (e.g., most objects/surfaces in a physical environment are stationary), thus, the configuration of a more than 50% of the voxel block is unchanged (e.g., the combination of plus/minus signs of the 8 voxels in a block rarely change). When the voxel block is unchanged, the faces created should be the same as before (e.g., the number of faces, and the three edge indices stored in each face remain the same), with only the vertex positions varying. Further, since each edge index encodes two end points, the system may determine the TSDF values of the two voxel end points and then update the associated vertex position without calculating the faces, as is discussed in more detail below.

In some examples, as each voxel block may be configured to store a sub-mesh, the system may apply a merge step that produces or updates the global mesh. In real-time applications, depth data is captured based on a current view and, thus, the system may limit updating and merging to the voxel blocks inside the viewing system to reduce processing time. For example, the system may perform a first loop over each voxel block to identify which voxel blocks to merge. Then, for each voxel block identified, the system may assign a global vertex index offset value determined based at least in part on an integer configured to accumulate vertex array size. Using the global vertex index offset value for each identified voxel block, the system may then merge each of the identified voxel blocks into the global mesh. For example, the system may add the faces of the voxel block to the global mesh and the edge indices associated with each face may be mapped to the global vertex indices.

In some examples, since the voxel blocks of various TSDF volumes may vary in size, such as 1×1×1, 2×2×2, and 4×4×4 for example, the system may from time to time need to merge the voxel blocks of different sizes. For instance, voxel blocks of different sizes or levels may be merged or unmerged as the user moves through the physical environment and the depth data associated with various surface changes (e.g., the user moves closer to a surface or further from a surface). In one example, a fusion of each voxel may be represented as:

$$V_t = [v_t, w_t], \text{ where}$$

$$v_t = \sum_{i=0}^{t} TSDF_i * w_i, \text{ and } w_t = \sum_{i=0}^{t} w_i$$

In this example, t is the $t^{th}$ depth frame and the averaged TSDF value is determined over multiple depth frames as $$SDF = \frac{v_t}{w_t}.$$

In the large scale SLAM application discussed here, the merge operation at a voxel may be represented as:

$$v = \sum_{j} \sum_{i \in VBj} TSDF_i * w_i$$

$$w = \sum_{j} \sum_{i \in VBj} w_i$$

By performing the operations discussed above, the system may be able to transition between the different levels of the voxel blocks. In another implementation, the system may identify a first and a second voxel block to merge. The first voxel block may be smaller than the second voxel block. In this example, the system may interpolate data associated with the second voxel block to form multiple voxel blocks of the same size as the first (smaller) voxel block. The system may then merge the first voxel block and the interpolated voxel blocks of the same size formed from the second voxel block.

In some implementation, when the mobile device is operating with limited computing or processing resources, the system may be configured to maintain a set of viewpoint bundles or a tracking viewpoint bundle set. For example, the tracking viewpoint bundle set may include a fixed number of viewpoint bundles, such as two to six viewpoint bundles. In another example, the tracking viewpoint bundle set may include each viewpoint bundle less than a graph distance, time distance, or physical distance threshold from the current viewpoint bundle pose.

Thus, in some cases, as the user moves away from a surface, the system may have to unmerge voxel blocks. However, since there are interpolated TSDF values in the mesh resulting from the merge discussed above, it is hard to cleanly remove the amount of data contributed by a particular voxel block during an unmerge process. Thus, the system may for each voxel block associate the data with a set container (or index) and track the data of the voxel block as the voxel blocks are merged. The system may also include a source mapper-id that may be added to the set and refer to the voxel block contributing the data when added. In this case, when the system umerges a voxel block, the source mapper-id may be removed from the container set, but TSDF values may not be subtracted (e.g., the values remain so the system does not need to re-interpolate TSDF values when the voxel block is merged once again). In this example, once the container set becomes empty, the system may remove the voxel from the tacking mesh as the voxel block is empty.

In some situations, a user of the system may return to a previously visited location within a physical environment and, thus, a current viewpoint bundle may be in close proximity to another viewpoint bundle (e.g., the viewpoint bundle generated the first time the user was at the location). In some cases, the system may connect or perform loop closure between viewpoint bundles. For example, when the viewpoint bundles are determined to be proximate to each other the system may connect or link them on a pose graph. For instance, the system may perform an image comparison between image data associated with the various viewpoint bundle to determine if the bundles are proximate. In other cases, the system may connect the viewpoint bundles based on a pose distance between each viewpoint bundle pose.

In some cases, the system may utilize the loop closure to form a pose graph linking various viewpoint bundle together. In some cases, the pose graph may be presented to a user on a display over the mobile device (or on another electronic device at a later time) and allow the user to add additional constraints or link viewpoints of multiple viewpoint bundles. By allowing the user to link viewpoints, the pose graph may be able to adjust viewpoints within the viewpoint bundles even when unable to detect a proximity between the two viewpoints. For instance, in some cases, drift over time may have caused the pose of the mobile device to slip when compared with actual physical location and, thus, two nearby viewpoints may be integrated as two distance viewpoints. The user may then link the two viewpoints and the system may correct the drift or error introduced during tracking and integration resulting in a more accurate 3D virtual environment.

FIG. 1 illustrates an example physical environment 100 including a user 102 of a spatial interaction system 104 according to some implementations. In some examples, the spatial interaction system 104 is configured to allow the user 102 to actively engage with the virtual environment by physically interacting (e.g., moving, arranging, etc.) the physical objects within the physical environment 100. In these cases, the spatial interaction system 104 may be configured to use inertial measurement unit (IMU) or orientation data captured by the controller device (not shown)

as well as tactical or haptic inputs received at the controller device as a user input within the virtual environment.

As the user 102 moves through the physical environment 100, the display device of the spatial interaction system 104 allows the user 102 to view a virtual representation of the physical environment 100 (e.g., to view a specific virtual environment representative of the physical environment). In other cases, the user 102 may utilize the spatial interaction system 104 to view a scene or other imaginary virtual environment that may incorporate one or more features of images captured by the device 104 as, for instance, a user input or manipulatable object within the virtual scene.

However unlike conventional systems that typically rely on multiple external imaging devices positioned in the physical environment to capture images of physical objects from multiple angles, the spatial interaction system 104 may rely on image capture components that may be approximate to or adjacent to the display device (as illustrated), such that the captured images are from substantially the perspective of the user 102 and/or the perspective of the spatial interaction system 104 (e.g., the pose of the mobile device). Thus, unlike the conventional system which restricts the user to a predefined area or space equipped with the external image devices, the spatial interaction system described herein allow the user 102 to move through a large continuous physical environment or from physical environment townat physical environment as part of one 3D environment or scene without additional setup and without interrupting the virtual experience.

In the current example, the spatial interaction system 104 is operating on a mobile device (such as the illustrated headset). However, it should be understood that the mobile deice may take any form, such as a tablet, smart phone, or other portable computing device. It should also be understood that the processing resources available to the mobile device may be limited and that rendering large unbounded 3D scene in substantially real-time often results in overwhelming the available processing resources when conventional techniques are utilized. Thus, in some cases, the spatial interaction system 104 may store or represent the 3D scene using viewpoint bundles and/or manifolds in a manner that the processing resources of the mobile spatial interaction system 104 are able to handle even given the potentially large 3D scene or environment.

For instance, in one implementation, the viewpoint bundles may be a collection of viewpoints, as discussed above, and an active or integration viewpoint bundle may be swapped in and out by the system 104 as the user 102 moves through the physical environment. Thus, at any one time, the amount of data stored or being integrated into the TSDF mesh may be limited. Likewise, the system 104 may utilize two or more 2.5D manifolds to update the TSDF mesh and to render the 3D scene, such that the stored depth values are integrated into the TSDF mesh in the background and tracking may be maintained even if the user 102 moves quickly through the physical environment.

Figure 2:
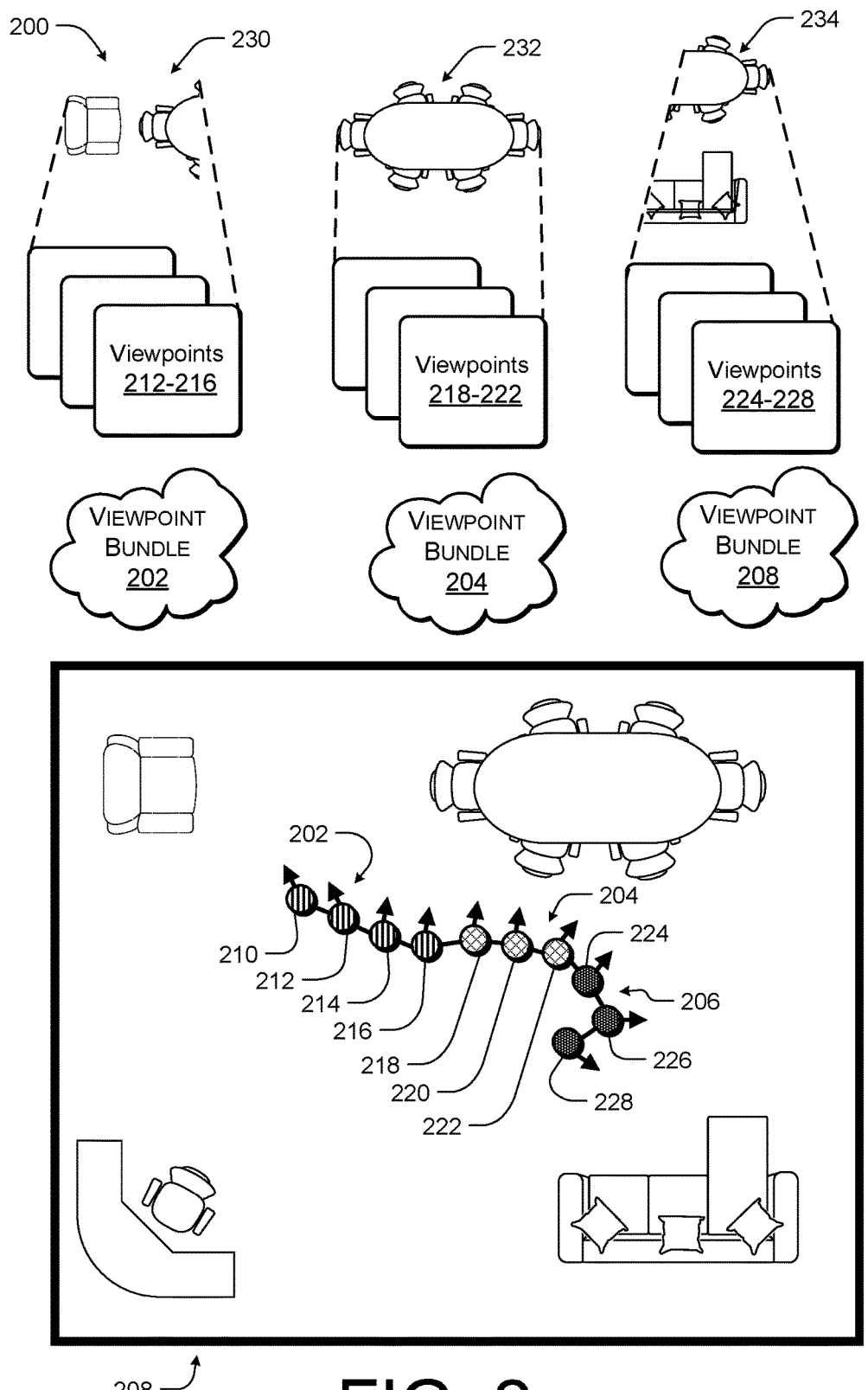
FIG. 2 is an example diagram showing an illustrative viewpoint bundles with respect to a physical environment according to some implementations.

FIG. 2 is an example diagram 200 showing illustrative viewpoint bundles 202, 204, and 206 with respect to a physical environment 208 according to some implementations. Each of the viewpoint bundles 202-206 is formed by multiple frames or viewpoints captured from a current camera pose as a user moves through the physical environment 208. For instance, the viewpoint bundle 202 includes viewpoints 210, 212, 214, and 216, the viewpoint bundle 204 includes viewpoints 218, 220, 222, and 216, and the viewpoint bundle 206 includes viewpoints 224, 226, 214, and 228.

For example, in the illustrated diagram 200, a user may move from viewpoint 210 to viewpoint 228, while a camera of a mobile device captures image data from a perspective or pose of the camera. A spatial interaction system operating on the mobile device, may cause the image data or frames represented as viewpoints 210-228 into a 3D environment or scene. In this example, the spatial interaction system may initialize the viewpoint bundle pose of the viewpoint bundle 202 as the pose of the viewpoint 210. The spatial interaction system may integrate the viewpoint image data 210-212 into a tracking TSDF mesh or model representing the virtual environment and associate each of the viewpoints 210-212 with the viewpoint bundle 202 based on a distance (e.g., graph distance or physical distance).

In another example, the spatial interaction system may assign viewpoints 210-218 to viewpoint bundles 202-206 based on a physical distance. For instance, the physical distance may be an estimated distance between the viewpoint bundle pose and the pose of each of the viewpoints 210-228. Thus, viewpoints 212-216 may be assigned to the viewpoint bundle 202 based on a distance from the pose of the viewpoint 210 (e.g., the pose of the viewpoint bundle was assigned based on the camera pose as the first viewpoint or frame).

Once the viewpoint 218 is captured by the camera, the distance between the pose of the viewpoint bundle 202 (e.g., the pose of viewpoint 210) may be too far from the pose of the camera when viewpoint 218 is captured. Thus, the spatial interaction system may generate a second viewpoint bundle 204 incorporating the image data associated with viewpoints 218-224 and assigning the pose of viewpoint 218 as the viewpoint bundle pose for viewpoint bundle 204. Likewise, the spatial interaction system may generate a third viewpoint bundle 206 incorporating the image data associated with viewpoints 226-228 and assigning the pose of viewpoint 226 as the viewpoint bundle pose for viewpoint bundle 206, as the distance between the pose of viewpoint 218 and the pose of viewpoint 226 may be too distant or greater than a distance threshold.

Additionally, as illustrated, each viewpoint bundle 202-206 may include image data representing portions 230, 232, and 234 of the physical environment 208 respectively. Thus, the spatial interaction system may be configured to switch or swap viewpoint bundles 202-206 as the user moves through the physical environment or returns to a previous position within the physical environment 208. In some implementations, the currently active viewpoint bundle may be considered an integration viewpoint bundle. By swapping the integration viewpoint bundle within the memory of the mobile device hosting the spatial interaction system, the system may capture a continuous 3D scene without overwhelming the limited resources of the mobile device. In some cases, the system may cause the integration viewpoint bundle to be swapped in memory or a new viewpoint bundle to be created based on a distance of a current pose of the mobile device to the integration viewpoint bundle pose, as discussed above. In this way, each viewpoint bundle may represent a portion of a scene or environment that may be rendered in substantially real-time by the limited resources of the mobile device. Thus, if the user returned to the position of viewpoint 210, the system may set the integration viewpoint bundle as the viewpoint bundle 202.

Figure 3:
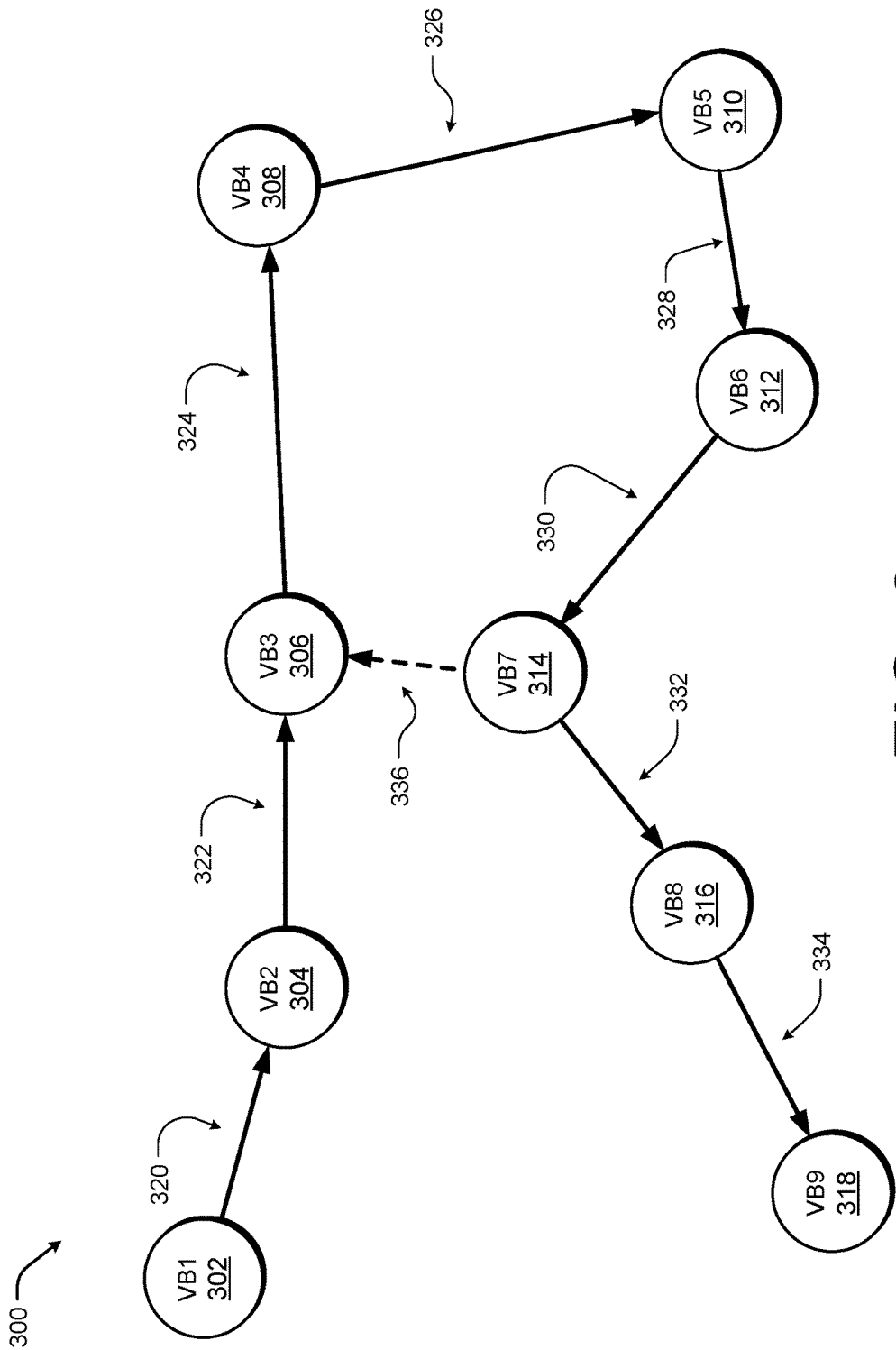
FIG. 3 is an example diagram showing an illustrative viewpoint bundle graph according to some implementations.

FIG. 3 is an example diagram showing an illustrative viewpoint bundle graph 300 according to some implementations. In the illustrated example, nine viewpoint bundles 302-318 have been generated by the system. Each of the viewpoint bundles 302-318 are linked, represented by connections 320-336, on the graph 300 based on the physical proximity to each other. In other words, two viewpoint bundles 302-318 may be related when the system switches the integration viewpoint bundle from one to another (e.g., the viewpoint bundles are created in sequence). In the current example, the connections 320-334 represent links generated in this manner (e.g., by sequential use of a viewpoint bundle 302-318 as the integration viewpoint bundle).

However, as the system tracks the pose of the camera, drift or error may be introduced over time. The system may correct or compensate for the drift or error by determining that the user has returned a position proximate to a previously visited position (e.g., the user is near the pose of one of the viewpoint bundles 302-318). In this example, the system detects that the pose of viewpoint bundle 314 is proximate to the pose of viewpoint bundle 306 (e.g., at the time viewpoint bundle 314 is the integration viewpoint bundle the user is near the pose of the viewpoint bundle 306). In this example, the system may perform loop closure. In some cases, to perform loop closure the system may detect that the camera is revisiting an area that was already explored before. For example, a loop closure detector may be used to identify a previously explored area. In some cases, the system may determine a loop closure should be performed when a current camera image matches above a threshold level with a previous images associated with previous viewpoint bundle. In this example, the system may perform loop closure and generate the connection 336 between viewpoint bundle 306 and the viewpoint bundle 314 by using a delta pose between the current pose and a viewpoint bundle pose. In this manner, the drift or error may, in one example, be distributed over the viewpoint bundles 306-314, such that the user does not experience issues due to extreme drift on one or two viewpoint bundles but rather each viewpoint bundle 302-318 has some degree of error with respect to the physical environment.

Figure 4:
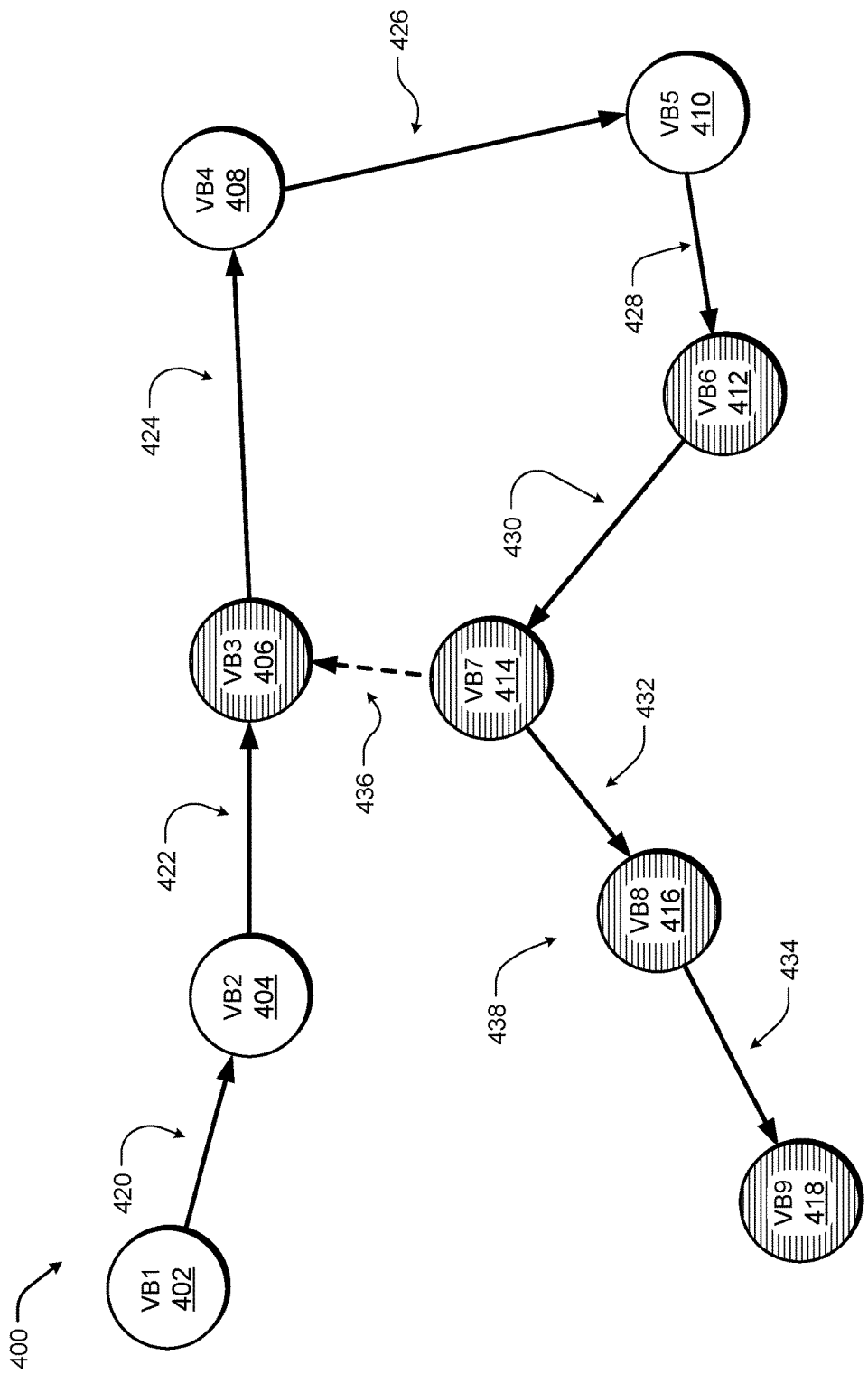
FIG. 4 is another example diagram showing an illustrative viewpoint bundle graph according to some implementations.

FIG. 4 is another example diagram showing an illustrative viewpoint bundle graph 400 according to some implementations. Similar to FIG. 3 above, in the illustrated example, nine viewpoint bundles 402-418 have been generated by the system. Each of the viewpoint bundles 402-418 are linked, represented by connections 420-436, on the graph 400 based on the physical proximity to each other. However, unlike FIG. 3, in the current example, the viewpoint bundle 318 is the integration viewpoint bundle being integrated into the TSDF mesh.

In this example, the system may align an active live depth and/or color frames to improve local tracking accuracy. In this example, the system may be configured to include a subset (e.g., the tracking viewpoint bundle subset 438) of viewpoint bundles 406, 412, 414, 416, and 418 as viewpoint bundles used to update the TSDF mesh or model for tracking. In various implementations, the tracking viewpoint bundle subset 438 may include any number of viewpoint bundles. For instance, in one example, the system may utilize a tracking viewpoint bundle subset having between 2 and 10 viewpoint bundles. In a specific example, the system may utilize a tracking viewpoint bundle subset having between 4 and 5 viewpoint bundles.

In some implementations, the number of viewpoint bundles 402-418 included in the tracking viewpoint bundle subset 438 may be based on a graph distance from the integration viewpoint bundle 418. For instance, in the illustrated example, the graph distance for the integration viewpoint bundle subset 438 may be set to three. Thus, since the integration viewpoint bundle is 418, the viewpoint bundles 418, 416, 414 and 412 are included in the integration viewpoint bundle subset 438. However, since the system performed loop closure on between viewpoint bundles 406 and 414, viewpoint bundle 406 is also included in the integration viewpoint bundle subset 438.

Figure 5:
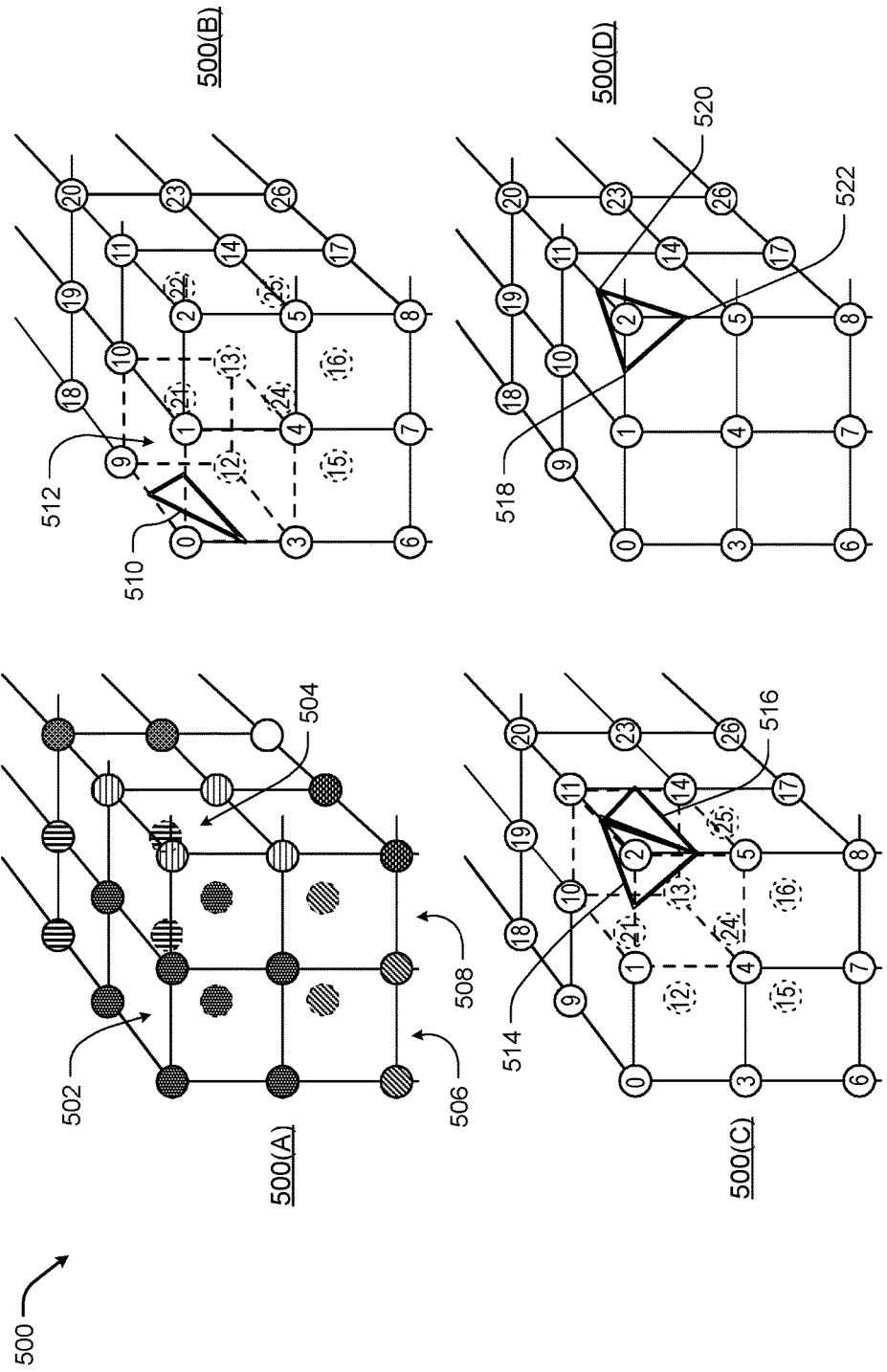
FIG. 5 is an example diagram showing an illustrative of a three-dimensional space represented using voxel blocks according to some implementations.

FIG. 5 is an example diagram showing an illustration of a three-dimensional space 500 represented using voxel blocks 502-508, bounded by individual voxels, such as voxels 0-26, according to some implementations. In the current example, the voxel blocks 502-508 are formed as a 2×2×2 cube of voxels when the corresponding space is observed (e.g., captured by the mobile device and/or added to the global mesh). In some cases, the voxel blocks 502-508 may be hashed to achieve a constant loop up time.

In addition to the hashing, each voxel block 502-508 also stores indices to neighbor voxel blocks, as discussed below with respect to FIG. 6, to further improve the look up time and in updating the triangular global mesh, as discussed below. In some cases, each voxel block 502-508 also maintains a sub-mesh which is computed from the voxel TSDF using marching cubes technique, as discussed above. In conventional marching cubes techniques, when the sub-meshes are merged into the global mesh, vertexes are often duplicated and stored twice, resulting in additional and unnecessary memory resource consumption.

For instance, in the current example, the voxel block 502 is formed from 8 voxels 0, 1, 3, 4, 9, 10, 12, and 13 and has a size of 2×2×2. In this example, the voxel block 502 is adjacent to the voxel block 504 and above the voxel block 506. With respect to 500(B), a face 510 is created in a cube 512 corresponding to the voxel block 502 using the marching cubes technique. Since all of the vertices are within the voxel block 502, the face 510 is stored with respect to voxel block 502. However, with respect to 500(C), the cube 514 being observed, has 4 voxels 1, 4, 10, and 13 associated with voxel block 502 and 4 voxels 2, 5, 11, and 14 associated with voxel block 504. Thus, when a face 514 is created, if all the three vertices were created and stored in the voxel block 502, when running marching cubes on the voxel block 504 (e.g., the adjacent voxel block 504), the face 516 is also created. However, the face 514 and 516 share two of the same vertices, and using conventional marching cubes techniques, the shared vertices would be created and stored in duplicate.

In some cases, the system described herein may be configured to avoid the vertex duplication when applying marching cubes. For instance, the system may first introduce indexing on voxels and on any created edges. In the current example of a system utilizing a 2×2×2 voxel block size, edges on the voxels adjacent to each voxel block are included in the indexing. For instance, for the voxel block 502, the voxels would be indexed. Thus, if the voxel block 502 had adjacent voxel blocks as shown, 27 voxels would be included in the indexing (e.g., the 27 indices assigned to the 27 voxels are determined by $v=x+y*3+z*9$, where x, y, z are the voxel coordinates in the extended voxel block). Thus, as shown with respect to the voxel block 502, 19 more voxels in other adjacent voxel blocks are included.

The indices to the edge may be represented as $e=3v+d$, where d is 0/1/2 when the edge direction is in x/y/z respectively, and v is the smaller index of the two voxels on the edge. In some cases, v may also be used to define the ownership of a voxel block 502-508 to an edge. For example, in 500(D) edge 518 belongs to the voxel block 502 but not to the voxel block 504, while edges 520 and 522 belong to the voxel block 504. Thus, with the edge index scheme for the marching cube technique discussed above, the system is able to determine if each voxel block 502-508 has ownership of an edge or if the edge belongs to a neighbor voxel block 502-508. Moreover, if an edge is owned by a neighbor voxel block 502-508, the system is able to identify the neighbor voxel block 502-508 and, thus, locate the converted edge index in that neighbor voxel block, as discussed in more detail below with respect to FIG. 6.

In some implementations, the system may precompute the voxel indexing and store the index in a lookup table. For example, with respect to 500(D), the edge 520 does not belong to the voxel block 502 but via the stored precomputed table lookup, the system is able to identify that edge 562 belongs to the voxel block 504 to the right of the voxel block 502 and as such the edge 562 does not need to be stored with respect to both the voxel block 502 and the voxel block 504, thereby preventing duplication.

While FIG. 5 is illustrated with respect to voxel blocks that have a size of 2×2×2 it should be understood that voxel blocks of other sizes, such as 4×4×4 may utilize similar technique to reduce duplication of edge vertex during application of marching cubes.

Figure 6:
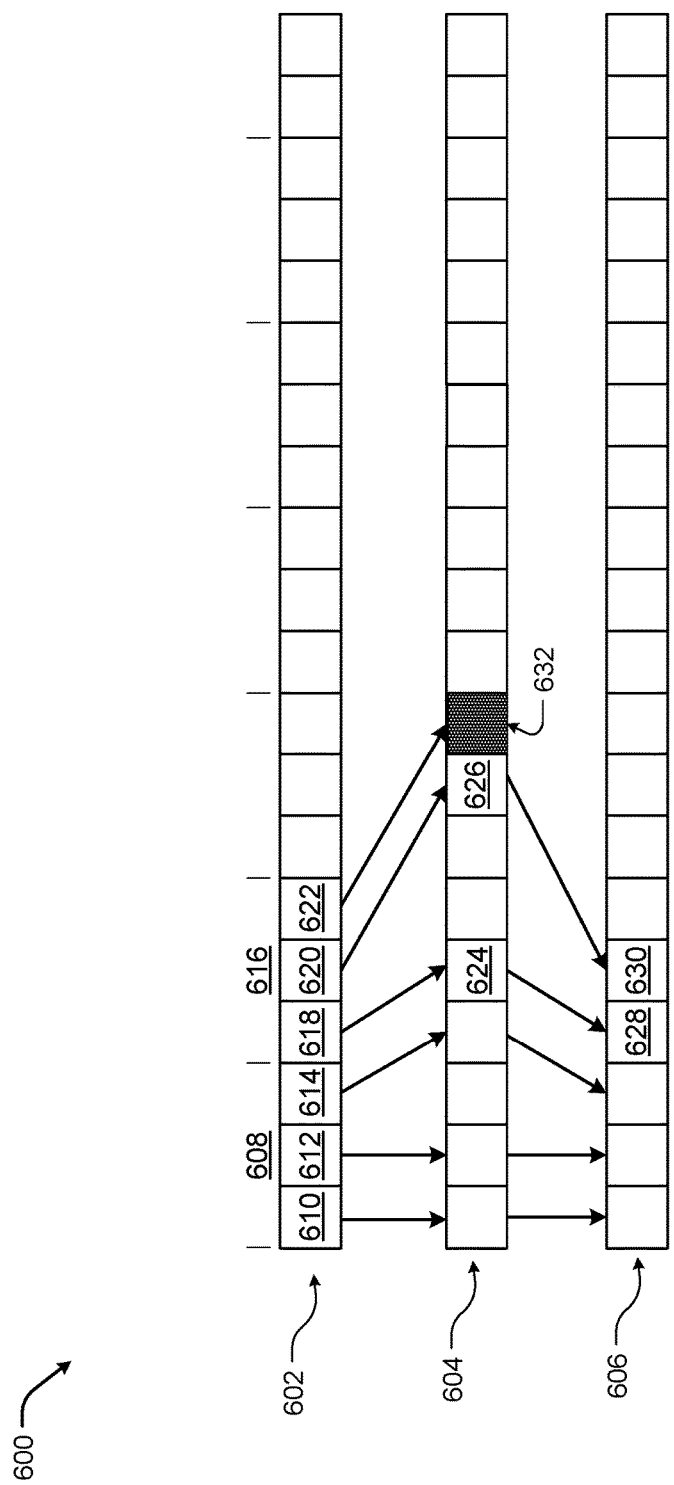
FIG. 6 is another example diagram showing an illustrative indexing of faces, edge to vertex, and vertex array according to some implementations.

FIG. 6 is another example diagram showing an illustrative indexing 600 of faces 602, edge to vertex 604, and vertex array 606 according to some implementations. As discussed above with respect to FIG. 5, an index 600 mapping faces 602, edges 604 into the vertex array 606 may be precomputed to reduce duplication of vertex creation and storage with respect to neighboring voxel blocks as marching cube technique is used to update the global mesh. From the edge indices 604, the system is able to determine if the edge/vertex belongs to a self-voxel block or to a neighbor voxel block. In the case where the edge/vertex belongs to a self-voxel block, the system may create a vertex and the vertex may be added to the local vertex array 606. In this regards, the system may utilize an edge-to-vertex-map data structure 604 in order to accurately map an edge index to a vertex index in the local vertex array 606.

In the current example, a first face 608 having three vertex 610, 612, and 614 as well as a second face 616 having three vertex 618, 620, and 622 are shown within the face array 602. For instance, the triangle face of 500(D) of FIG. 5 may be represented by the face 616 having two vertex within the voxel block 504 and one vertex in the neighbor voxel block 502, as discussed above. Thus, the vertex 618 and 620 are associated with valid entry in the edge to vertex map 604, shown as entries 624 and 626. Thus, a vertex 628 and 630 is crated within the vertex array 606 and associated with each of the entries 624 and 626. However, the vertex 622 is within the voxel block 502, and thus no entry is created in the edge to vertex map 604 (or a null entry, represented by entry 632, is created). Further, since the entry 632 belongs to the neighbor voxel block 502, no vertex is crated within the vertex array 606 corresponding to the voxel block 504.

In one example, the indices of the vertexes are derived when two local sub-meshes are merged into the global mesh. In this example, the system may be configured to perform a first loop over all voxel blocks and determine if each voxel block should be merged. For instance, since a physical environment is primary static (e.g., most objects/surfaces in a physical environment are stationary), the configuration of a more than 50% of the voxel blocks are typically unchanged and do not need to be merged. For the voxel blocks that the system identified as to be merged, the system may assign an offset value to each. Then the system may perform a second loop over the remaining voxel blocks to be merged and add faces to the global mesh. At this point, the system may utilize the edge indices stored in each face to prevent duplicate vertex creation. For example, the system may for each vertex utilize the indexing 600 to locate the voxel block that owns the updated vertex, and add the assigned offset value to the index in the local vertex array 606.

Figure 7:
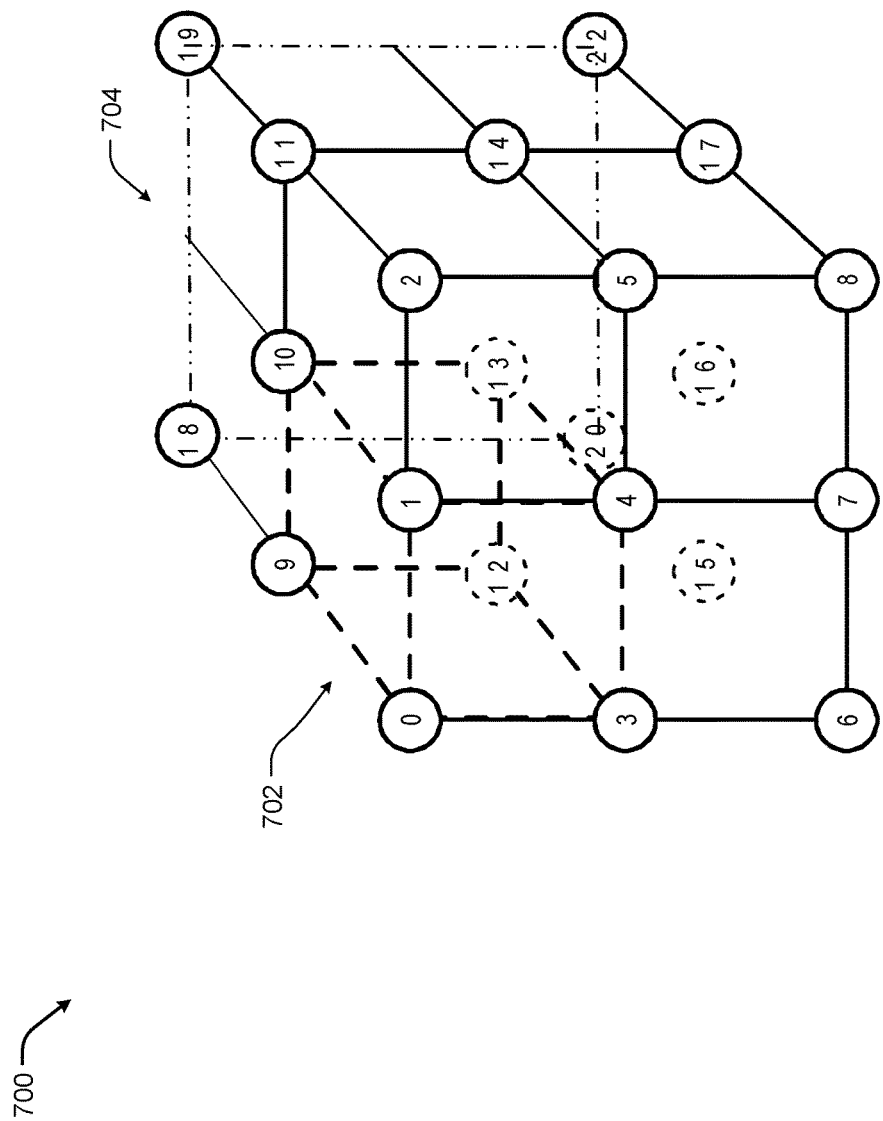
FIG. 7 is an example diagram showing an illustrative of a three-dimensional space represented using voxel blocks of different sizes according to some implementations.

FIG. 7 is an example diagram showing an illustrative of a three-dimensional space 700 represented using voxel blocks, such as voxel block 702, representing using the dashed line, of different sizes according to some implementations. In an illustrative example, the marching cubes technique described above will be applied with respect to voxel block cubes having sizes of 1×1×1 and 2×2×2 but may be applied to combine or merge voxel blocks of different sizes, such as a 2×2×2 voxel block with a 4×4×4 voxel block. As discussed above with respect to FIG. 5, each voxel may be assigned an index value with some voxel indices being associated with a neighbor voxel block. In the illustrated example, voxels 0-17 may from voxel blocks of size 1×1×1. However, the voxels 18-22 from a voxel block 704, representing using the dashed and dotted line, that is twice the size of voxel block 702 or 2×2×2.

In this example, to produce watertight meshes on such a grid, first the system may partition the super voxel block having voxels 0-22 into 6 pyramids (top, bottom, left, right, front, back, all of which have voxel 13 as the pyramid top). For each pyramid, the system can have some voxels with missing values. Example, possible pyramids that may be generated from merging coarser and finer voxel blocks, such as voxel blocks 702 and 704, are illustrated with respect to FIG. 8 below.

This partition step allows us to process the 6 partitions independently. For example, the system may first mesh all neighbors that are coarser using one marching pyramid. Second, the system may identify share-plane neighbor that have the same density level (e.g., voxel blocks of the same size) and mesh using four marching pyramids. Third, the system may identify three share-edge neighbors that are coarser. The system then meshes the three share-edge neighbors using two marching pyramids and one marching tetrahedral. Next, the system identifies two share-edge neighbors that are coarser and meshes using three marching pyramids, two marching pyramids, and two marching tetrahedras. Finally, the system may identity one share-edge neighbors that are coarser and meshes using four marching pyramids.

In this example, the voxel block edges are indexed. For instance, as discussed above, a face stores 3 edge indices and with marching pyramid, the edges have more direction and the indexing applies additional constraints. To enable the additional constraints, the system may precompute a lookup table having a size of 125×125 and a pixel value at a point (x, y) stores the edge index of the edge connecting points with the index x and y. As such, the value may be only computed once during initialization.

In some cases, the system may also unmerge voxel blocks from the global mesh as the user moves away from a position or a surface becomes more distant. During the unmerge process, the system may associate a voxel block with a set container and track where the voxel block as the voxel block is merged into the mesh. The system may then add a source mapper-id to the set together with the TSDF values whenever the TSDF mesh is updated. When the system unmerges a voxel block, the source mapper-id may be removed from the set, but TSDF values are maintained. Thus, once the set becomes empty, the system knows the voxel block is empty and may be removed.

Figure 8:
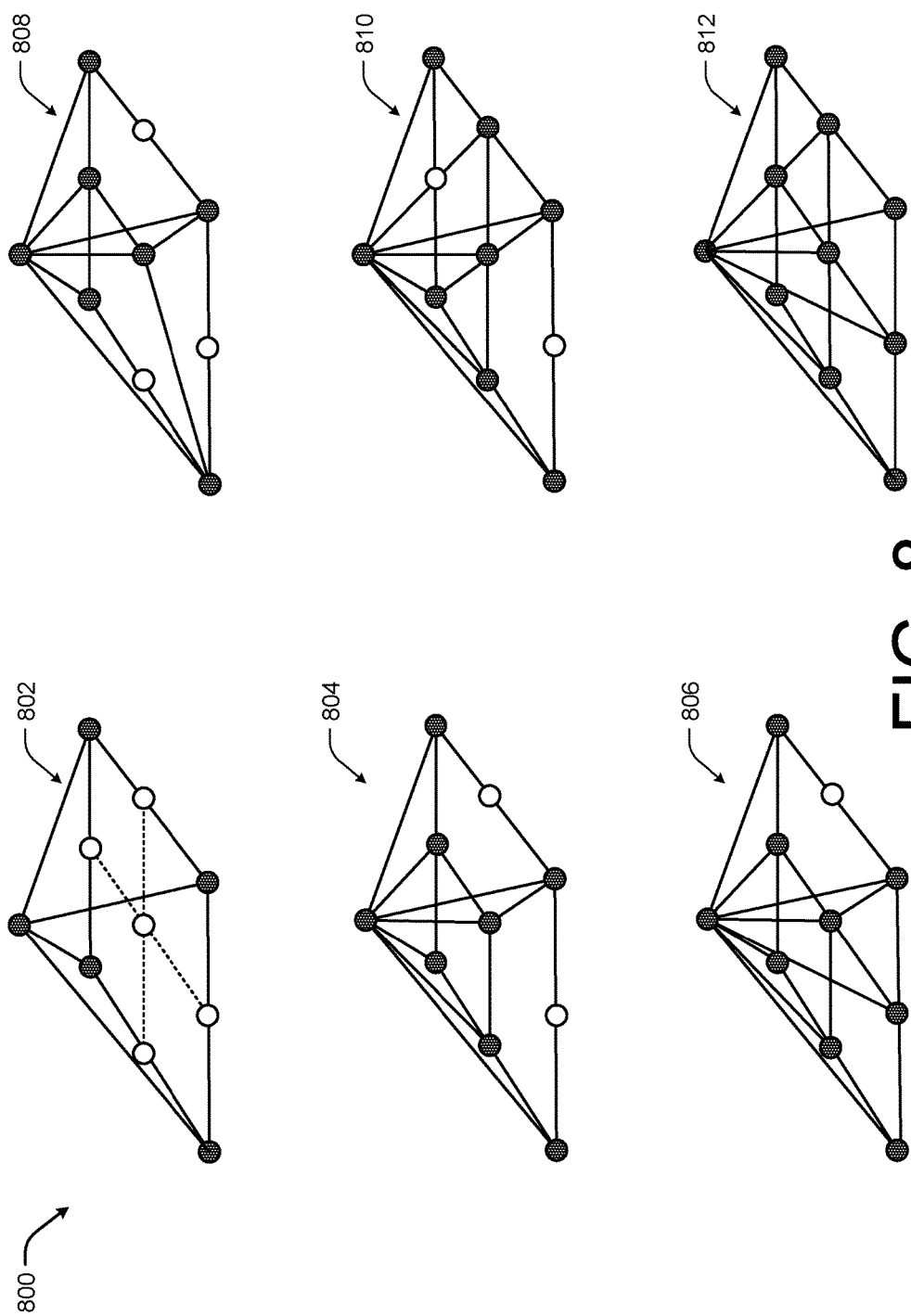
FIG. 8 is an example diagram showing an illustrative pyramids that may be formed when merging a coarser voxel block with a finer voxel block according to some implementations.

FIG. 8 is an example diagram 800 showing illustrative pyramids 802-812 that may be formed when merging a coarser voxel block with a finer voxel block according to some implementations. For example, pyramid 802 may be formed from two coarser voxel blocks adjacent to each other. Pyramid 804 and 810 may be formed from two finer voxel blocks adjacent to two coarser voxel blocks. Pyramid 806 may be formed from three finer voxel blocks adjacent to one coarser voxel block. Pyramid 808 may be formed from one finer voxel block adjacent to three coarser voxel blocks. Pyramid 812 may be formed from four adjacent finer voxel blocks.

Figure 9:
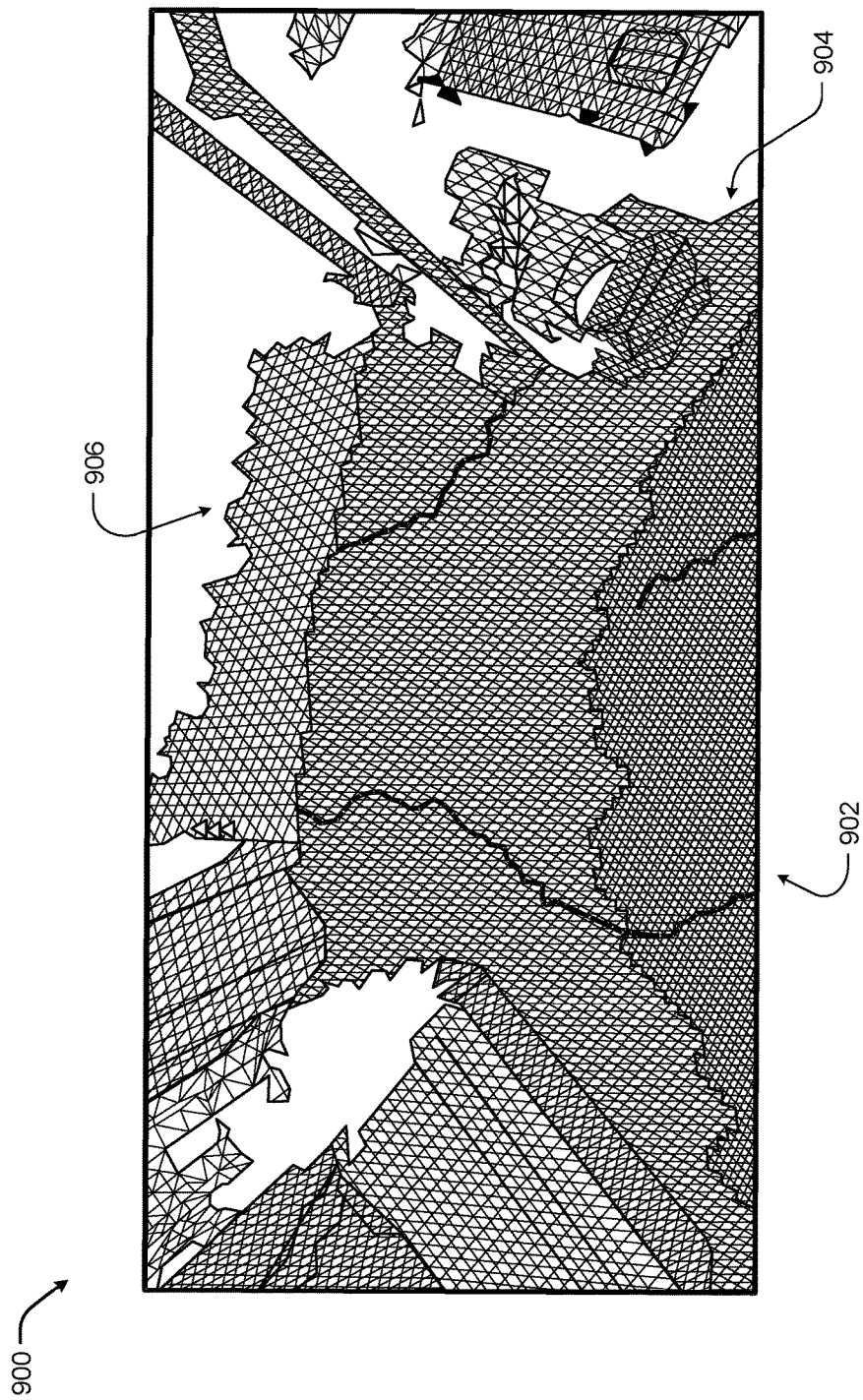
FIG. 9 is an example diagram showing an illustrative three-dimensional representation of an environment rendered using three different sizes of voxel blocks according to some implementations.

FIG. 9 is an example diagram showing an illustrative three-dimensional representation 900 of an environment rendered using three different sizes of voxel blocks, generally indicated by 902, 904, and 906, according to some implementations. As discussed above, in some examples, the system may be configured to user larger and larger voxel block sizes to represent the 3D scene at further and further distances from the pose of the mobile device. In these examples, each voxel block, such as the voxel blocks 902-904, may be configured to store a sub-mesh and the system may apply a merge step (such as an add or subtract) that produces or updates the global mesh, as discussed above with respect to FIGS. 5-8.

Figure 10:
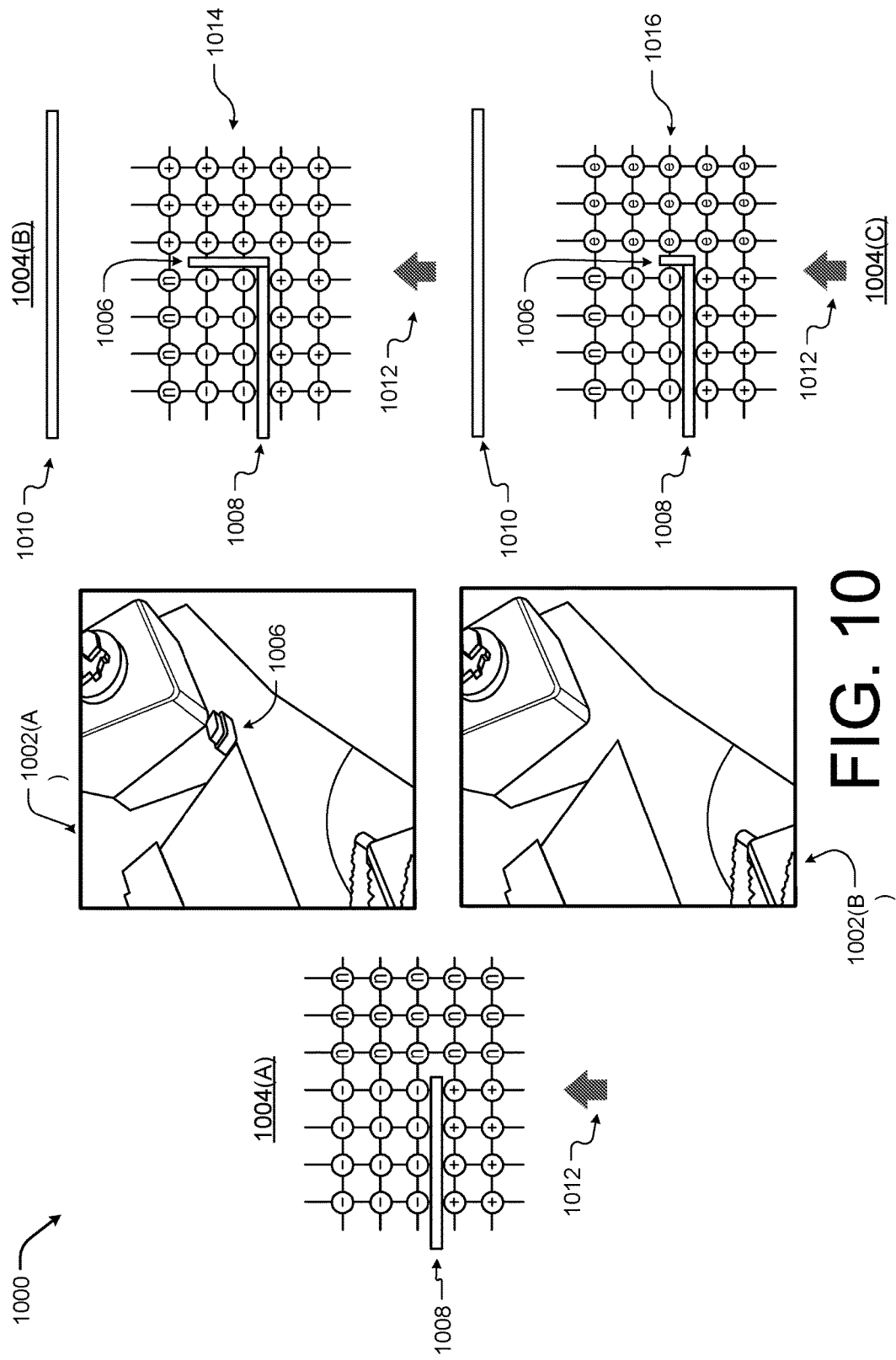
FIG. 10 is an example diagram showing an illustrative three-dimensional representation with respect to depth data according to some implementations.

FIG. 10 is an example diagram 1000 showing an illustrative three-dimensional representation 1002 with respect to depth data from the viewing direction 1012 according to some implementations. For example, the system discussed herein may utilize a dynamic truncation distance to render objects. In this example, the dynamic truncation distance may depend on how distant the observed surface is from the pose of the mobile device. For instance, a surface that is closer to the current pose may result in a smaller truncation distance being used by the system in order to avoid erroneous extrusions, as a smaller truncation distance is typically better at preserving thin structure within the three-dimensional representation 1002. On the other hand, for surface that is observed farther from the pose of the mobile device, the system may utilize a larger truncation distance so that sensor noise at far range does not result in generating cluttered and erroneous reconstruction.

In one implementation discussed herein, the system may reduce rendering extrusions, such as extrusion 1006, as the large truncation distance is increased. For instance, the system may flag voxels as a "+" representing the space in front of a surface, a "−" representing space behind a surface, as "n" representing a space that is not observed or no depth data is available for, or as "e" representing empty space in front of a surface (further than the truncation distance from the surface). In the illustrated example, the highlighted space 1008 represents unobserved space and the transition between "−" and "+" values indicates that the system should render a surface (e.g., a real surface), such as surface 1010.

In the illustrated example, the three-dimensional representation 1002 originally includes no extrusion 1006 as shown by 1004(A) as no background has been observed. As the background is observed, the conventional TSDF update technique fills the depth data, generally indicated by 1014, with positive "+" values causing the system to render the extrusion 1006, as shown in 1002(A). However, the system discussed herein, may cause the depth data, generally indicated by 1016, in front of the background 1010 to be labeled as "e" or empty space. Thus, during application of marching cubes, the system may be configured to require a minimum number of distance values (such as one in a set of four) with positive values to create a triangle, and, thus, the extrusions 1006 is reduced as shown, as the values around the extrusion 1006 in the depth data 1014 are (n, +, +) but in the depth data 1016 the values are (n, −, e, e).

Figure 11:
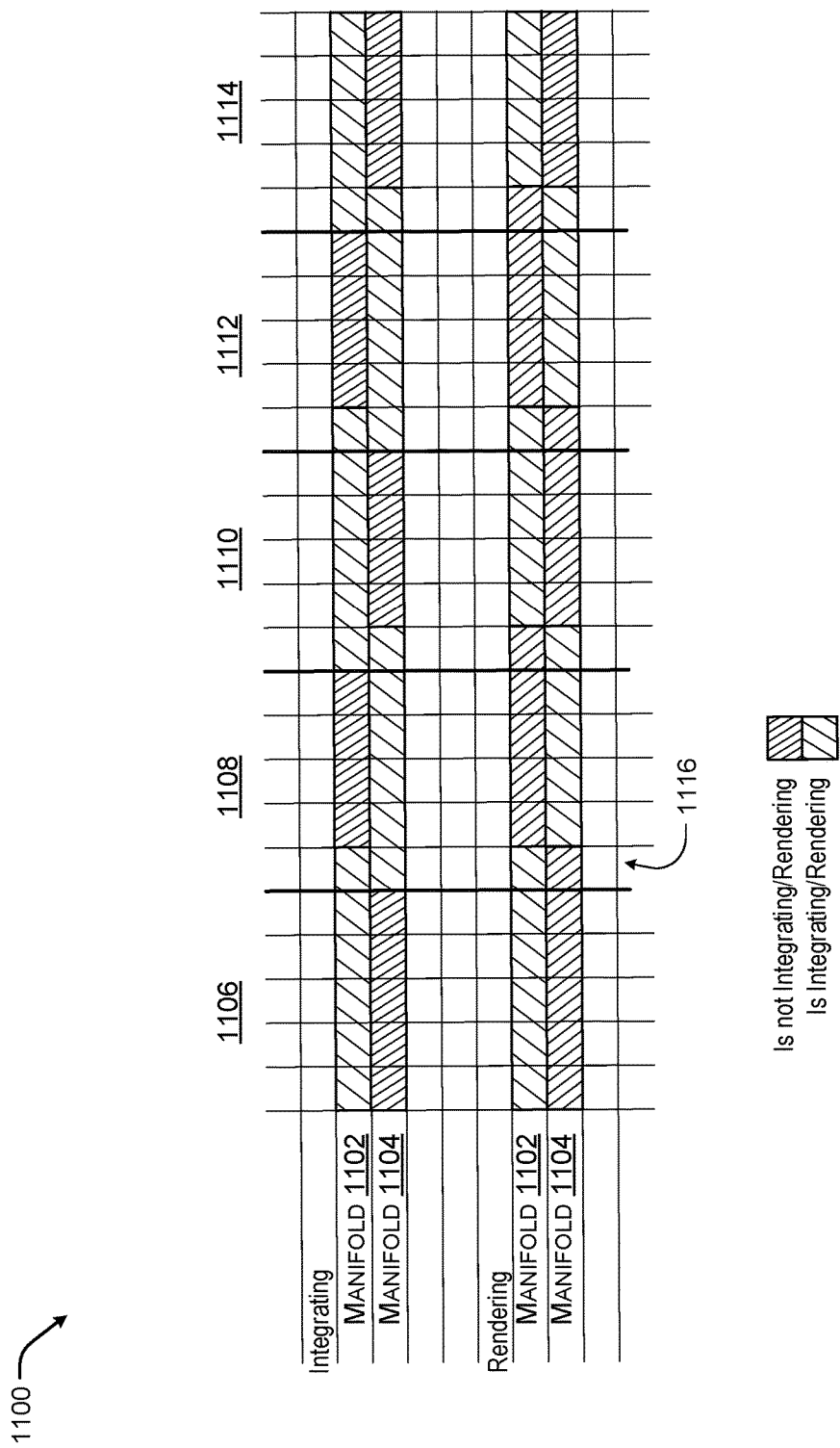
FIG. 11 is an example showing an illustrative timing diagram with respect to manifold updating according to some implementations.

FIG. 11 is an example showing an illustrative timing diagram 1100 with respect to manifold updating according to some implementations. In some cases, it may be desirable to perform the integration of depth data into the global mesh in a background thread opposed to the active thread. For example, when the system is operating on a mobile device in real-time it may be appropriate to perform the integration in the background thread, but the background thread may be too slow and some depth frames are skipped and not integrated into the tracking mesh. Fortunately, over a short period of time it is highly unlikely that the geometry of a room changes and becomes strongly occluded. Thus, the system discussed herein is able to accurately represent the physical environment in 2.5D (e.g., via a depth frame from a single viewpoint).

For example, the system may generate a manifold to represent the 2.5D environment. As discussed above, a manifold is a frame that will store the results of fusing multiple depth frames into a single frame. For example, a manifold may contain a pose, such as a 6DOF, set to an initial incoming depth frame in the manner that a viewpoint bundle pose is set. The pose of the manifold represents the projective center of the depth points in the initial depth frame, and a set of camera intrinsics which are utilized to describe or represent a projective behavior of values in the depth frame (e.g., conditions associated with the capture of the depth frame). 3D points may then be determined from the manifold by de-projecting depth points and applying the manifold pose to each of the de-projected depth points, thereby rendering a 3D environment.

In some cases, manifolds may be associated with viewpoint bundles and initialized at the start of scanning and reinitialized at regular intervals (e.g., once every n frames or upon a detected change in mobile device pose). When manifolds are initialized the pose of the manifold is set to match the pose of the incoming depth frame (e.g., the current mobile device pose). The intrinsics of the manifold may be fixed or hardcoded, set to match the incoming depth frame's intrinsics, or calculated from the incoming depth frame's intrinsics.

During operations, depth frames are integrated into the manifold in response to the system performing tracking. For example, the system may provide a pose of the mobile device along with each incoming depth frame. The depth values in the incoming depth frame are then de-projected using the intrinsics, warped using the relative pose between the current location of the mobile device and the pose of the manifold, projected into the manifold using the manifold's intrinsics, and, finally, used to update the weights and values of the manifold. Integration of incoming depth frames into a manifold is a faster operation than integrating depth frames into a TSDF of comparable resolution. Thus, manifold updating is able to operate in-line with tracking operations opposed to operating as a background task on a separate thread like TSDF.

In some cases, such as in response to a large change in pose, the manifold may be reset and the manifolds depth and weight values may be flushed or integrated with the tracking TSDF. Since a manifold weight at a given pixel value increases with each depth observation, the weight at each pixel value may be used to represent a confidence in each of the depth values in the manifold (e.g., how accurate each depth value is of the actual depth in the physical environment). As such, the weights may be used to inform the TSDF integration process of which manifold depth values are of high confidence and the TSDF weights and values can be changed to reflect that confidence.

In some examples, the manifold may be utilized as a reference data for pose tracking. For instance, in some implementations, the systems may perform tracking by finding a pose which aligns with incoming depth data based on depth data of a reference model (e.g., the TSDF). In order to use the TSDF as a reference model, the system may maintain or update a TSDF mesh by integrating new data as the data is captured. However, the TSDF integration is a slow background operation, as a result TSDF meshes used for tracking are often several frames older than the incoming depth frame, and may result in the introduction of error into the 3D environment. For example, if the user moves quickly, existing TSDF meshes may be out of view before the TSDF mesh is updated or usable for tracking. However, Manifolds are updated every frame and, thus, contain more up to date information than the TSDF mesh. Further, the manifolds are not meshed each time the manifold is updated, but rather may be sent to a GPU as a texture and rendered by using texture values to perturb a flat, constant mesh in a manner similar to height or displacement mapping. This operation may be performed for every frame. The result is that the rendered reference data from a manifold is one from behind the incoming depth data and the tracking may be maintained even when the user moves quickly through a physical environment.

In the current example, to provide a smoother user experience, two manifolds 1102 and 1104 may be used and updated as image data is captured. For instance, the two manifolds 1102 and 1104 may be used in a ping pong style in which one manifold 1102 is integrating with the TSDF mesh and rendering at time 1106 and the manifold 1104 is being re-initialized. Then at time 1108, the manifold 1104 beings to integrate and render, while the manifold 1102 is re-initialized. This pattern may then continue over time 1110-1114 and so forth. In some cases, the manifold 1002 may continue to render for a period 1016 within the time 1108 to provide visual continuity to the user. Likewise, the manifold 1104 may continue to perform integration over the period 1116 within the time 1108. However, unlike the rendering where only manifold 1102 is rendered during the period 1116, both the manifold 1102 and the manifold 1104 are integrating during the period 1116.

In the current example, the manifold may include a single weighted depth value for each pixel. However, in other examples, the manifold may be a three-dimensional array that may store multiple depth values for each pixel. For instance, the single depth value associated with each pixel represents the surface visible at the depth value from the perspective of an associated viewpoint or pose. However, if a user of the system moves or changes poses, additional surfaces that are occluded at the viewpoint or pose associated with the manifold may become visible. If the manifold only stores a single weighted depth value representative of a single surface than the system may have difficulties rendering the previously occluded surfaces.

Thus, in some cases, one or more of the manifolds may be configured to store K, or a threshold number, of depth values with respect to a single pixel. In this manner, the second weighted depth value may represent a distance to a second surface occluded by the first surface based on the viewpoint or pose. Likewise, the third weighted depth value may represent a distance to a third surface occluded by the first surface and/or the second surface based on the viewpoint or pose and the fourth weighted depth value may represent a distance to a fourth surface occluded by the first surface, the second surface, and/or the third surface based on the viewpoint or pose.

FIGS. 12-17 are flow diagrams illustrating example processes associated with integrating image data into an unbounded mesh according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 12:
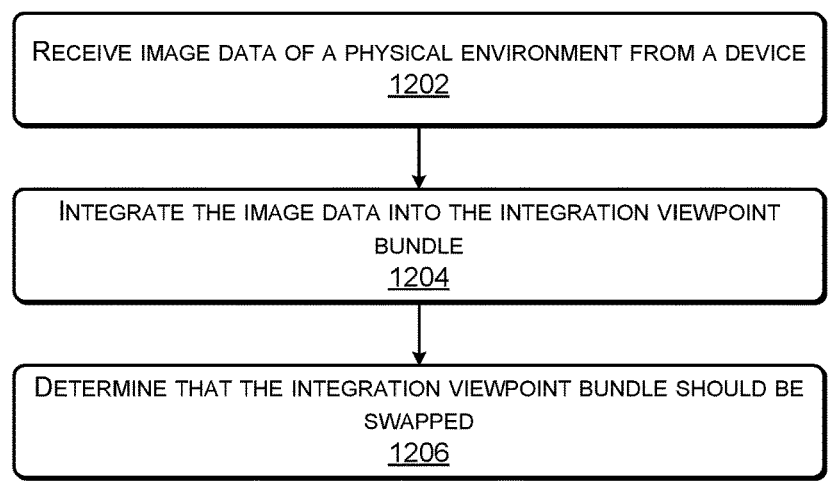
FIG. 12 is an example flow diagram showing an illustrative process for associating image data with a viewpoint bundle according to some implementations.

FIG. 12 is an example flow diagram showing an illustrative process 1200 for associating image data with a viewpoint bundle according to some implementations. As discussed above, in some implementations, the system is configured to model a physical space as a 3D virtual environment using a collection of viewpoint bundles. Each viewpoint bundle may include a collection of viewpoints. In some cases, the volume generated by the TSDF function and associated with each viewpoint bundle may be based on or include a viewpoint bundle pose. The viewpoint bundle pose may correspond to the pose of the mobile device at the time the first image incorporated into the viewpoint bundle was captured.

At 1202, the system may receive image data of a physical environment from a device. For example, the mobile device may include or be associated with a camera, such as one or more of a red-green-blue camera, standard color camera, depth camera, etc. and the system may receive the image data captured by each associated camera for integration into a 3D scene.

At 1204, the system may integrate the image data into an integration viewpoint bundle. For instance, each frame of image data may be added to the integration viewpoint bundle as an additional viewpoint having a pose based on the pose of the mobile device. The image data stored as voxel blocks in the viewpoint bundle may also be integrated into a tracking TSDF which can be triangulated into a mesh for tracking.

At 1206, the system may select an integration viewpoint bundle. In one example, if the current pose (e.g., the pose of the device) becomes too distant (e.g., greater than a threshold distance) from the viewpoint bundle pose, the system may select a new viewpoint bundle as the integration viewpoint bundle. For instance, the system may swap or switch the integration viewpoint bundle when the system determines the compute distance between the translation and the rotation of the current camera pose and the integration viewpoint bundle pose exceed a distance threshold. In another instance, the system may implement a time threshold to cause a new viewpoint bundle to be loaded into memory. In still other instances, drift or error thresholds may be set and the system may monitor the accuracy of the mobile device pose estimation and change the integration viewpoint bundle if the accuracy estimate falls below the error threshold. In this way, each viewpoint bundle may represent a portion of a scene or environment that may be rendered in substantially real-time by the limited resources of the mobile device and swapped when the user enters a physical location proximate to the viewpoint bundle pose.

Figure 13:
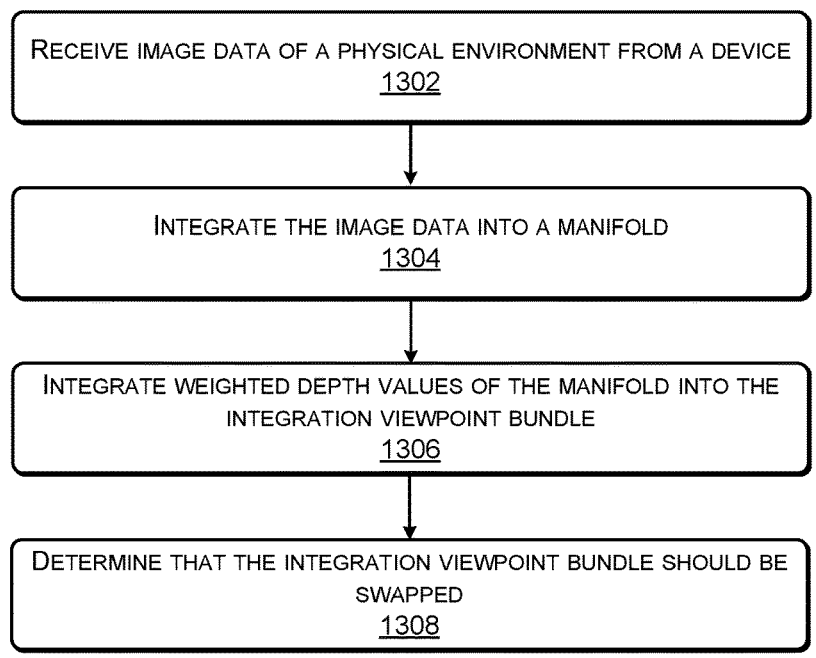
FIG. 13 is another example flow diagram showing an illustrative process for associating image data with a viewpoint bundle according to some implementations.

FIG. 13 is another example flow diagram showing an illustrative process 1300 for associating image data with a viewpoint bundle according to some implementations. As discussed above, in some cases, a 2.5D manifold may be updated based on the incoming or captured depth frames. In this case, rather than updating the TSDF mesh with the depth data of each depth frame, the system may update the manifold with the depth data by calculating a weighted depth value for each pixel of the manifold. The manifold may then be used to update the TSDF mesh, such that the TSDF mesh is updated periodically rather than at the time each depth frame is captured. In this manner, the system may operate in substantially real time and the updating of the manifold may be done in a foreground thread.

At 1302, the system may receive image data of a physical environment from a device. For example, the mobile device may include or be associated with a camera, such as one or more of a red-green-blue camera, standard color camera, depth camera, etc. and the system may receive the image data captured by each associated camera for integration into a 3D scene. In this case, the image data may include depth frames or depth data.

At 1304, the system may integrate the image data into the manifold. For example, for each depth frame of the image data, the manifold may update a corresponding weighted depth value. For example, the manifold may be a two-dimensional array and the each pixel of the array may have a corresponding weighted depth value. In some cases, two manifolds may be utilized. The first manifold may be initialized while the second manifold is being used to integrate the depth data and then vice versa.

At 1306, the system may integrate the manifold into an integration viewpoint bundle. For instance, the manifold may be associated with a viewpoint bundle and used to update the viewpoint bundle at regular intervals (e.g. once every n frames or upon a detected change in mobile device pose). The weighted depth value corresponding to each pixel may be used to integrate the depth data of the manifold into the viewpoint bundle. Thus, the processing heavy integration of the depth data with the viewpoint bundle may be performed at less frequent intervals (e.g., less often than for every depth frame).

At 1308, the system may select an integration viewpoint bundle. In one example, if the current pose (e.g., the pose of the device) becomes too distant (e.g., greater than a threshold distance) from the viewpoint bundle pose, the system may select a new viewpoint bundle as the integration viewpoint bundle. In this case, the manifold may be integrated with the previous viewpoint bundle then re-initialized. In this manner, the weighted depth values of the manifold may be reset, such that the depth data collected with respect to the previous integration viewpoint bundle does not become associated with the new integration viewpoint bundle.

Figure 14:
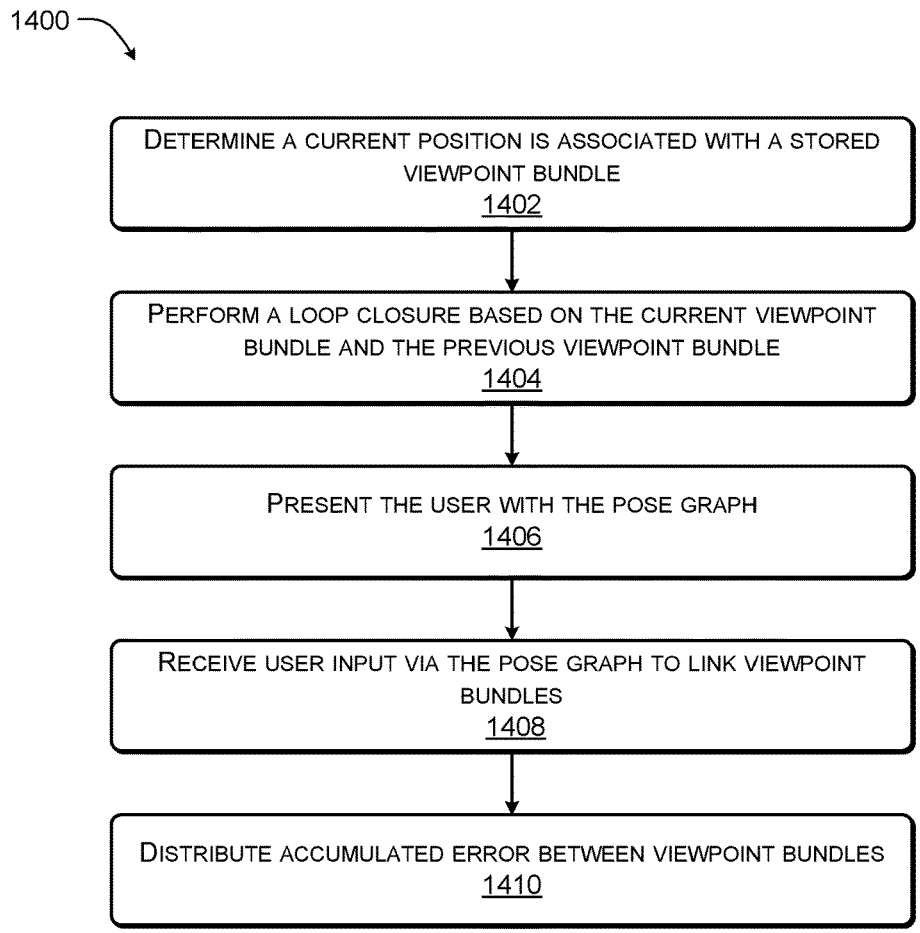
FIG. 14 is an example flow diagram showing an illustrative process for linking viewpoints of viewpoint bundles according to some implementations.

FIG. 14 is an example flow diagram showing an illustrative process 1200 for linking viewpoints of viewpoint bundles according to some implementations. For example, a system may maintain a pose graph of the viewpoints that may be utilized to add and subtract viewpoints from various viewpoint bundles. Additionally, the pose graph may be useful for distributing error or drift through the viewpoint bundles to prevent excessive error when viewing any one portion of the 3D environment.

At 1402, the system may determine a current position is associated with a stored viewpoint bundle. For instance, a user may return to a position proximate to a previous position within the physical environment. Thus, the image data being captured is physically close to the pose of the previously generated viewpoint bundle.

At 1404, the system may perform a loop closure based on the current integration viewpoint bundle and the previous viewpoint bundle. For example, the system may utilize the loop closure to form a pose graph linking various viewpoints of different viewpoint bundle together.

At 1406, the system may present the pose graph to the user. For instance, the graph may be presented as a supplemental content to the 3D scene or the user may view the pose graph offline when not engaged with the 3D environment.

At 1408, the system may receive a user input to link two viewpoint bundles. For instance, in some cases, by allowing the user to link viewpoint bundles, the pose graph may be able to adjust the viewpoint bundles even when unable to detect a proximity between the two viewpoints or two viewpoint bundles. For instance, in some cases, drift over time may have caused the pose of the mobile device to slip when compared with actual physical location and, thus, two nearby viewpoints may be integrated as two distance viewpoints.

At 1410, the system may distribute accumulated error between viewpoint bundles. For example, after two viewpoints are linked or connected, the system may reduce the effect of the drift or error introduced during tracking and integration by distributing the error among the various viewpoint bundles using a pose graph optimization technique.

Figure 15:
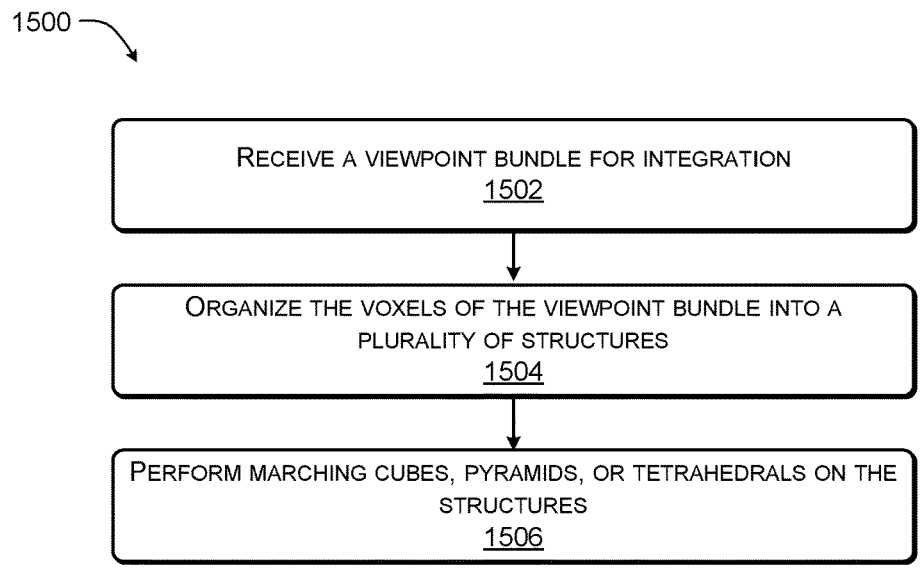
FIG. 15 is an example flow diagram showing an illustrative process for integrating image data into a global mesh according to some implementations.

FIG. 15 is an example flow diagram showing an illustrative process 1300 for integrating image data into a global mesh according to some implementations. For example, the image data may be stored in a plurality of viewpoint bundles and each viewpoint bundle may store the image data as voxels. In some cases, the system may update the global mesh from the voxel data of the integration viewpoint bundle.

At 1502, the system may receive a viewpoint bundle for integration. For example, the integration viewpoint bundle may provide image data in the form of voxels to be merged with the global mesh as the mobile device captures image data and the captured image data is incorporated into the viewpoint bundle.

At 1504, the system may form the voxels into a plurality of structures (e.g., cubes, pyramids, and tetrahedras), and, at 1506, the system may perform marching cubes, pyramids, or tetrahedras on the structures. For example, the system may first mesh all neighbors that are coarser using one marching pyramid. Second, the system may identify share-plane neighbor has the same density level (e.g., voxel blocks of the same size) and mesh using four marching pyramids. Third, the system may identify three share-edge neighbors that are coarser. The system then meshes the three share-edge neighbors using two marching pyramids and one marching tetrahedral. Next, the system identifies two share-edge neighbors that are coarser and meshes using three marching pyramids, two marching pyramids, and two marching tetrahedras. Finally, the system may identity one share-edge neighbors that are coarser and meshes using four marching pyramids.

Figure 16:
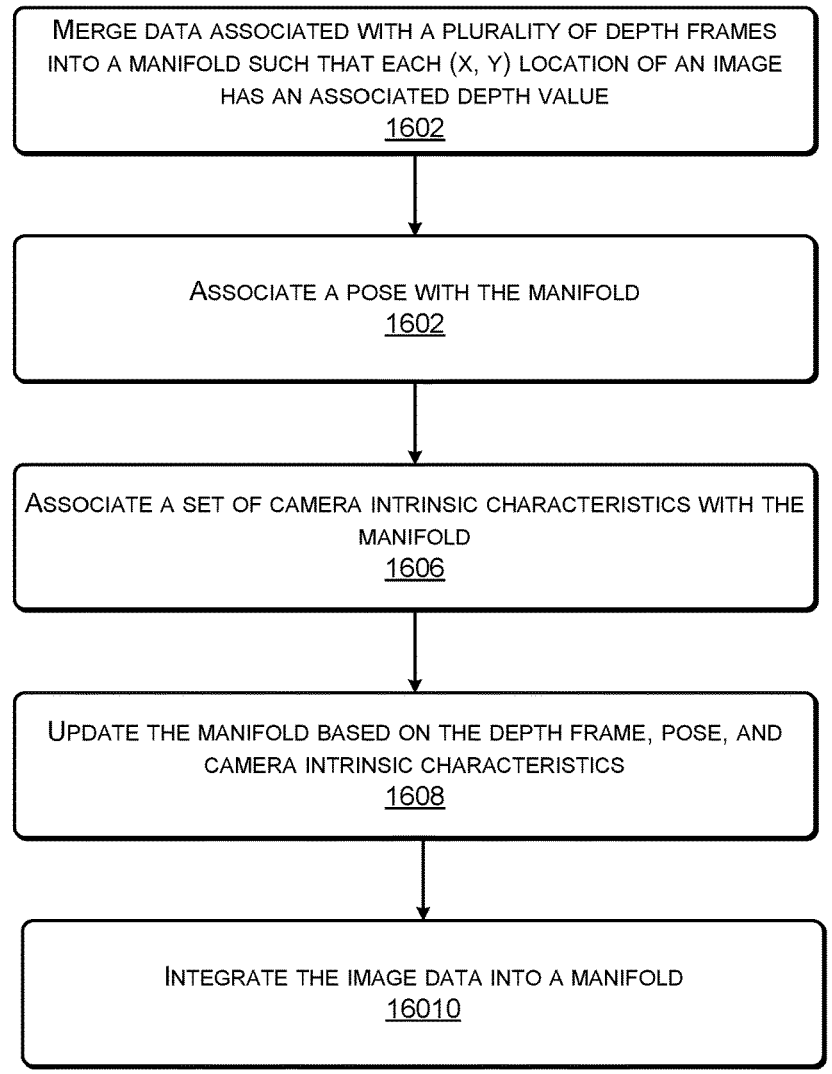
FIG. 16 is an example flow diagram showing an illustrative process for utilizing manifolds to render 3D scenes according to some implementations.

FIG. 16 is an example flow diagram showing an illustrative process for utilizing manifolds to capture 3D scenes according to some implementations. In some cases, the 3D virtual environment may be represented as a 2.5D or less than a full 3D mesh. For example, the system may represent the 3D virtual environment as a 2.5D manifold. A manifold is a frame that will store the results of fusing multiple depth frames into a single frame. For example, a manifold may contain a pose set to an initial incoming depth frame in the manner that a viewpoint bundle pose is set. The pose of the manifold represents the projective center of the depth points in the initial depth frame, and a set of camera intrinsics which are utilized to describe or represent a projective behavior of values in the depth frame (e.g., conditions associated with the capture of the depth frame).

At 1602, the system may merge data associated with a plurality of depth frames into a manifold such that each (x, y) location of an image has an associated depth value. For example, depth frames may be integrated into the manifold in response to the system performing tracking.

At 1604, the system may associate a pose with the manifold. For example, the system may provide a pose of the mobile device along with each incoming depth frame. The system may then assign the pose of the mobile device as the pose of the manifold.

At 1606, the system may associate a set of camera intrinsic characteristics with the manifold. For example, the manifold's intrinsics may be fixed or hardcoded, set to match the incoming depth frame's intrinsics, or calculated from the incoming depth frame's intrinsics.

At 1608, the system may update the manifold based on the depth frame, pose, and camera intrinsic characteristics. For example, the depth values in the incoming depth frame may be de-projected using the intrinsics, warped using the relative pose between the current location of the mobile device and the pose of the manifold, projected into the manifold using the manifold's intrinsics, and finally, used to update the weights and values of the manifold. Integration of incoming depth frames into a manifold is a faster operation than integrating depth frames into a TSDF of comparable resolution. Thus, manifold updating is able to operate in-line with tracking operations opposed to operating as a background task on a separate thread like TSDF.

At 1610, the system may integrate the manifold into an integration viewpoint bundles. For instance, the manifold may be integrated with a viewpoint bundle at regular intervals or when the integration viewpoint bundle is swapped. The weighted depth value corresponding to each pixel may be used to integrate the depth data of the manifold into the viewpoint bundle. Thus, the processing heavy integration of the depth data with the viewpoint bundle may be performed at less frequent intervals (e.g., less often than for every depth frame).

Figure 17:
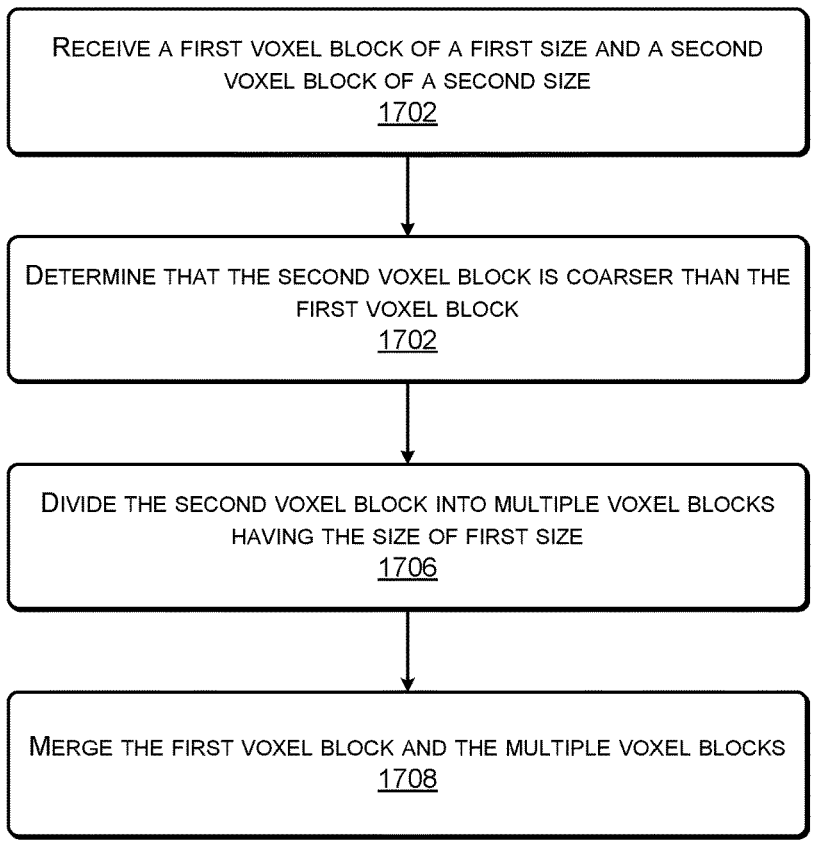
FIG. 17 is an example flow diagram showing an illustrative process for merging voxels of different sizes according to some implementations.

FIG. 17 is an example flow diagram showing an illustrative process 1700 for merging voxels of different sizes according to some implementations. In some examples, since the voxel blocks of various TSDF volumes may vary in size, such as 1×1×1, 2×2×2, and 4×4×4 for example, the system may from time to time need to merge the voxel blocks of different sizes. For instance, voxel blocks of different sizes or levels may be merged or unmerged as the user moves through the physical environment and the depth data associated with various surface changes (e.g., the user moves closer to a surface or further from a surface).

At 1702, the system may receive a first voxel block of a first size and a second voxel block of a second size. For example, the first voxel block may be finer and the second voxel block may be coarser (having less data).

At 1704, the system may determine that the second voxel block is coarser than the first voxel block. For instance, in some cases, the system may be unaware that the two voxel blocks have different coarseness when the voxel blocks are received. In this case, the system may determine which of the two voxel blocks are coarser or if the two voxel blocks have the same size prior to merging.

At 1706, the system may divide the second voxel block into multiple voxel blocks having the size of first size. For example, the system may interpolate data associated with the second voxel block to form multiple voxel blocks of the same size as the first finer voxel block. In some cases, the interpolation may be based on the data associated with the first voxel block and its neighbors.

At 1708, the system may merge the first voxel block and the multiple voxel blocks generated from the coarser or second voxel block. The system may also track the data of the voxel block as the voxel blocks are merged via a set container. For example, the system may include a source mapper-id that may be added to the set container and refer to the voxel block contributing the data when the first voxel block is merged with the multiple voxel blocks. In this case, when the system unmerges a voxel block, the source mapper-id may be removed from the container set and once the container set becomes empty, the system may remove the voxel from the tacking mesh as the voxel block is empty.

Figure 18:
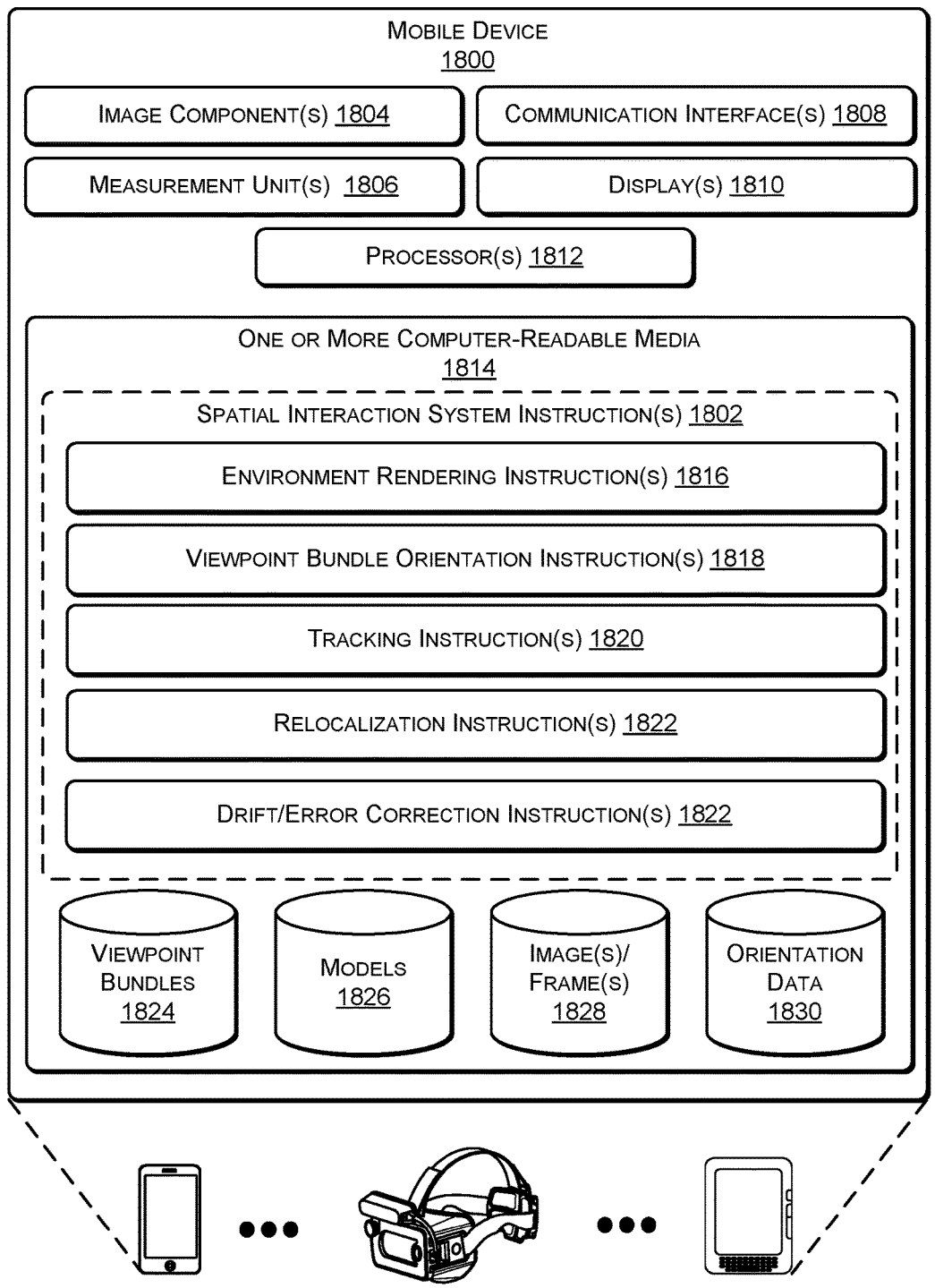
FIG. 18 is an example mobile device hosting a spatial interaction system according to some implementations.

FIG. 18 is an example mobile device 1800 hosting a spatial interaction system 1802 according to some implementations. For example, as discussed above, in some cases, the system 1802 may be an application installed on various types of electronic devices, such as a mobile phone, tablet, portable computer, laptop, etc. in addition to a system configured to secure to a head of a user. In the current example, the mobile device may include image components 1804 for capturing visual data, such as images, frames, and depth data, from a physical environment. For example, the image components 1804 may be positioned to capture multiple images (e.g., red-green-blue and depth images) from the perspective of the device 1800. The image components 1804 may be of various sizes and quality, for instance, the image components 1804 may include one or more wide screen cameras, 3D cameras, high definition cameras, video cameras, depth cameras, among other types of cameras.

As discussed above, the system 1802 may capture the 3D scene using a plurality of viewpoint bundles and each of the viewpoint bundles may include a viewpoint bundle pose. Additionally, the system 1802 may track the position of the user within a physical environment using the pose of the mobile device. Thus, the mobile device 1800 may include one or more measurement units 1806 to determine the orientation data of the mobile device 1800 (e.g., acceleration, angular momentum, pitch, roll, yaw, etc.) that may be usable by the system 1802 for determining the pose of a frame, image, viewpoint, viewpoint bundle, etc.

The mobile device 1800 may also include one or more communication interfaces 1808 configured to facilitate communication between one or more networks, one or more cloud-based services. The one or more communication interfaces 1808 may support both wired and wireless connection to various networks, such as cellular networks, radio (e.g., radio-frequency identification (RFID)), WiFi networks, short-range or near-field networks (e.g., Bluetooth®), infrared signals, local area networks, wide area networks, the Internet, and so forth.

In the illustrated example, the mobile device 1800 also includes a display 1810, such as a virtual environment display or a traditional 2D display. For instance, in one example, the display 1810 may include a flat display surface, such as a touch screen, combined with optical lenses configured to allow a user of the system 1800 to view the display 1810 in 3D. Some examples of the display 1810 that can be used with the implementations described herein include bi-stable LCDs, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, the display 1810 may include an active display such as a LCD, a plasma display, a light emitting diode (LED) display, an organic light emitting diode (OLED) display, and so forth or a reflective display, such as an electronic paper display, a reflective liquid crystal display (LCD), or the like.

The mobile device 1800 may also include one or more processors 1812, such as at least one or more access components, control logic circuits, central processing units, or processors, as well as one or more computer-readable media 1814 to perform the function associated with the system 1802. Additionally, each of the processors 1812 may itself comprise one or more processors or processing cores.

Depending on the configuration, the computer-readable media 1814 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 1812.

Several modules such as instruction, data stores, and so forth may be stored within the computer-readable media 1814 and configured to execute on the processors 1812. For example, as illustrated, the environment rendering instructions 1816, viewpoint bundle orientation instructions 1818, tracking instructions 1820, relocalization instructions 1822, drift/error correction instructions 1822 as well as data such as viewpoint bundles 1824, models 1826 (e.g., 3D models of objects, scenes, and surfaces), images and/or frames 1828 (e.g., data captured by the image components 1804), and orientation data 1830 (e.g., the data collected by the measurement units 1806).

The rendering instructions 1816 may be configured to render a 3D scene or environment to a user on the display 1810. For example, the rendering instructions 1816 may render a 3D environment using voxel blocks of various size or coarseness, such that the further the surfaces distance to the position of the user, the less detail or larger the voxel blocks used. In some cases, the rendering instructions may be configured to merge or unmerge voxel blocks from a rendered mesh as the user moves through the physical environment, as discussed above.

The viewpoint bundle orientation instructions 1818 may be configured to determine a pose of the mobile device at the time a viewpoint bundle is created or generated and to assign that pose as the pose of a viewpoint bundle. In some cases, the viewpoint bundle orientation instructions 1818 may be configured to add viewpoints to a particular viewpoint bundle based on, for instance, distance between a current pose of the mobile device 1800 and the pose of the viewpoint bundle.

The tracking instructions 1820 may be configured to merge sub-meshes associated with the voxels of the viewpoint bundles into a tracking or global mesh when the system 1802 is rendering a 3D scene. In some cases, the tracking instructions 1820 may utilize two manifolds of 2.5D to update the global mesh in substantially real-time, as discussed above.

The relocalization instructions 1822 may be configured to locate a user within a 3D scene or environment. For example, a pose of the mobile device 1800 may be determined by the relocalization instructions 1822 and then compare with the pose of various viewpoint bundles in order to select and load one of the viewpoint bundles as the integration viewpoint bundle.

The drift/error correction instructions 1822 may be configured to perform loop closure between viewpoint bundles when the viewpoint bundles are determined to be proximate to each other. For instance, the drift/error correction instructions 1822 may perform an image comparison between image data associated with the various viewpoints and determined to the viewpoint bundles to be proximate based on matching image data. In other cases, the system may connect the viewpoint bundles based on a pose distance between each viewpoint. When the viewpoint bundles are close together, the drift/error correction instructions 1822 may perform loop closure and/or add, subtract, and/or move viewpoints from one viewpoint bundle to another. In some cases, the pose graph may be presented to a user on a display over the mobile device and allow the user to add additional constraints or link viewpoints of multiple viewpoint bundles. By allowing the user to link viewpoints, the pose graph may be able to adjust viewpoints within the viewpoint bundles even when unable to detect a proximity between the two viewpoints. As discussed above, drift over time may have caused the pose of the mobile device 1800 to slip when compared with actual physical location and, thus, two nearby viewpoints may be integrated as two distance viewpoints. The drift/error correction instructions 1822 may then distribute the error over viewpoints and/or viewpoint bundles such that no one viewpoint or viewpoint bundle has excessive error or drift.

FIG. 19 is an example pseudocode 1900 associated with updating K-depth manifold according to some implementations. For example, as discussed above the manifold may be a three-dimensional array that may store multiple depth values for each pixel. For instance, the single depth value associated with each pixel represents the surface visible at the depth value from the perspective of an associated viewpoint or pose. However, if a user of the system moves or changes poses, additional surfaces that are occulated at the viewpoint or pose associated with the manifold may become visible. If the manifold only stores a single weighted depth value representative of a single surface than the system may have difficulties rendering the previously occluded surfaces. Thus, the example pseudocode 1900 illustrates utilizing a k-depth manifold to assist with objects that may be occluded based on a viewpoint associated with the manifold including determining spurious data that may be caused by edges of non-regular surfaces.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a display for presenting a virtual environment to a user;
one or more image components for capturing image data associated with a physical environment surrounding the user;
one or more processors;
non-transitory computer-readable media storing computer-executable instructions, which when executed by the one or more processors cause the one or more processors to perform operations including:
receiving first image data captured by the one or more image components at a first time;
organizing the first image data into a first viewpoint based at least in part on a first pose associated with the system at the first time;
assigning the first viewpoint to a first viewpoint bundle;
integrating the first image data into a Truncated Signed Distance Function (TSDF);
receiving second image data from the one or more image components, the second image data captured at a second time, the second time after the first time;
organizing the second image data into a second viewpoint based at least in part on a second pose associated with the system at the second time;
determining the second pose is greater than a threshold distance from a first viewpoint bundle pose associated with the first viewpoint bundle;
generating a second viewpoint bundle based at least in part on the second viewpoint;
assigning the second viewpoint bundle a second viewpoint pose based at least in part on the second pose associated with the system at the second time; and
integrating the second image data into the TSDF.

2. The system as recited in claim 1, wherein the non-transitory computer-readable media stores additional computer-executable instructions, which when executed by the one or more processors cause the one or more processors to perform operations including:
receiving third image data captured by the one or more image components at a third time, the third time after the first time and the second time;
organizing the third image data into a third viewpoint based at least in part on a third pose associated with the system at the third time;
assigning the third viewpoint to a second viewpoint bundle based at least in part on a pose of the system at the third time;
integrating the third image data into the TSDF;
receiving fourth image data from the one or more image components, the fourth image data captured at a fourth time, the fourth time after the first time, the second time, and the third time;
organizing the fourth image data into a fourth viewpoint based at least in part on a fourth pose associated with the system at the fourth time;
determining the fourth pose is greater than a second threshold distance from the second viewpoint bundle pose;
generating a third viewpoint bundle based at least in part on the fourth viewpoint;
assigning the third viewpoint bundle a third viewpoint pose based at least in part on the fourth pose associated with the system at the fourth time; and
integrating the fourth image data into the TSDF.

3. The system as recited in claim 2, wherein the non-transitory computer-readable media stores additional computer-executable instructions, which when executed by the one or more processors cause the one or more processors to perform operations including:
generating a pose graph including the first viewpoint bundle, the second viewpoint bundle, and the third viewpoint bundle; and
determining a delta pose difference between the first viewpoint bundle pose and the third viewpoint bundle pose is less than a threshold; and
in response, connecting the first viewpoint bundle and the third viewpoint bundle within the pose graph.

4. The system as recited in claim 2, wherein the non-transitory computer-readable media stores additional computer-executable instructions, which when executed by the one or more processors cause the one or more processors to perform operations including:
generating a pose graph including the first viewpoint bundle, the second viewpoint bundle, and the third viewpoint bundle; and
determining a delta pose difference between the first viewpoint bundle pose and a current pose of the one or more image component is less than a threshold; and
in response, connecting the first viewpoint bundle and the third viewpoint bundle within the pose graph.

5. The system as recited in claim 2, wherein the non-transitory computer-readable media stores additional computer-executable instructions, which when executed by the one or more processors cause the one or more processors to perform operations including:
generating a pose graph including the first viewpoint bundle, the second viewpoint bundle, and a third viewpoint bundle;
presenting the pose graph and a display;
receiving a user input to link the first viewpoint bundle and the third viewpoint bundle; and
connecting the first viewpoint bundle and the third viewpoint bundle within the pose graph; and
distributing error associated with the pose graph based at least in part on a physical proximity indicated by the connecting of the first viewpoint bundle with the third viewpoint bundle.

6. The system as recited in claim 2, wherein the non-transitory computer-readable media stores additional computer-executable instructions, which when executed by the one or more processors cause the one or more processors to perform operations including:
generating a pose graph including the first viewpoint bundle, the second viewpoint bundle, and a third viewpoint bundle;
connecting the first viewpoint bundle and the third viewpoint bundle within the pose graph; and
distributing error associated with the pose graph based at least in part on a physical proximity indicated by the connecting of the first viewpoint bundle with the third viewpoint bundle.

7. The system as recited in claim 1, further comprising:
an inertial measurement unit; and
wherein the non-transitory computer-readable media stores additional computer-executable instructions, which when executed by the one or more processors cause the one or more processors to perform operations including determining the first pose based at least in part on data collected by the inertial measurement unit.

8. The system as recited in claim 1, wherein the first image data includes depth data and red-green-blue data.

9. A method comprising:
receiving first image data captured by the one or more image components at a first time;
organizing the first image data into a first viewpoint based at least in part on a first pose associated with the system at the first time;
assigning the first viewpoint to a first viewpoint bundle;
integrating the first image data into a Truncated Signed Distance Function (TSDF);
receiving second image data from the one or more image components, the second image data captured at a second time, the second time after the first time;
organizing the second image data into a second viewpoint based at least in part on a second pose associated with the system at the second time;
determining the second pose is greater than a threshold distance from a first viewpoint bundle pose associated with the first viewpoint bundle;
generating a second viewpoint bundle based at least in part on the second viewpoint;
assigning the second viewpoint bundle a second viewpoint pose based at least in part on the second pose associated with the system at the second time; and
integrating the second image data into the TSDF.

10. The method as recited in claim 9, wherein integrating the first image data into the TSDF further comprises:
receiving a first voxel block of a first size and a second voxel block of a second size, the second size coarser than the first size;
generating a super voxel block including at least the first voxel block and the second voxel block;
integrating adjacent voxel blocks of the super voxel block having the second size using one marching pyramid into a mesh;
integrating up to four adjacent voxel blocks of the first size with a share-plane of the super voxel block using four marching pyramids into the mesh;
integrating voxel blocks of the first size and voxel blocks of the second size sharing three edges within the super voxel block using two marching pyramids and one marching tetrahedral into the mesh;
integrating voxel blocks of the first size and voxel blocks of the second size sharing two edges within the super voxel block using three marching pyramids, two marching pyramids, and two marching tetrahedras into the mesh; and
integrating voxel blocks of the first size and voxel blocks of the second size sharing one edges within the super voxel block using four marching pyramids into the mesh.

11. The method as recited in claim 10, wherein the voxel blocks of the second size corresponding to a surface in the physical environment at a distance greater than a threshold from a first pose and the voxel blocks of the first size corresponding to at least a second surface in the physical environment at a distance less than the threshold from the first pose.

12. The method as recited in claim 10, wherein the mesh is a global triangle mesh representing a physical environment.

13. The method as recited in claim 10, further comprising:
storing a first vertex of a surface associated with a first voxel block within a first local vertex array corresponding to the first voxel block; and
computing an index mapping the first vertex to a first entry in an edge array and the first entry in the edge array to a local vertex array.

14. The method as recited in claim 13, further comprising:
identifying a second vertex associated with a second voxel block, the second voxel block adjacent to the first voxel block;
mapping the second vertex to a second entry in the edge array; and
determining that an edge corresponding to the entry in the edge array belongs to the first voxel block to the particular voxel block.

15. The method as recited in claim 9, further comprising:
wherein integrating the first image data into the TSDF further comprises updating a manifold based at least in part on a first depth frame of the first image data, the manifold being a two-dimensional array and wherein each pixel of the two-dimensional array includes a weighted depth value;
wherein integrating the second image data into the TSDF further comprises updating the manifold based at least in part on a second depth frame of the second image data;
determining a threshold period has elapsed; and
in response to the threshold period elapsing, integrating the weighted depth values of the manifold into the TSDF.

16. The method as recited in claim 15, further comprising initializing the manifold prior to receiving the first image data based at least in part on intrinsic characteristics of a camera capturing the first image data and the second image data.

17. The method as recited in claim 15, wherein:
updating the manifold based at least in part on the first depth frame includes updating weighted depth values associated with pixels of the two-dimensional array represented in the first depth frame; and
updating the manifold based at least in part on the second depth frame includes updating weighted depth values associated with pixels of the two-dimensional array represented in the second depth frame.

18. A non-transitory computer-readable media storing computer-executable instructions, which when executed by one or more processors cause the one or more processors to perform operations including:
receiving first image data captured by the one or more image components at a first time;
organizing the first image data into a first viewpoint based at least in part on a first pose associated with the system at the first time;
assigning the first viewpoint to a first viewpoint bundle;
integrating the first image data into a Truncated Signed Distance Function (TSDF);
receiving second image data from the one or more image components, the second image data captured at a second time, the second time after the first time;
organizing the second image data into a second viewpoint based at least in part on a second pose associated with the system at the second time;
determining the second pose is greater than a threshold distance from a first viewpoint bundle pose associated with the first viewpoint bundle;
generating a second viewpoint bundle based at least in part on the second viewpoint;

assigning the second viewpoint bundle a second viewpoint pose based at least in part on the second pose associated with the system at the second time; and integrating the second image data into the TSDF.

19. The non-transitory computer-readable media of claim 18, wherein:

integrating the first image data into the TSDF further comprises:

updating a manifold based at least in part on a first depth frame of the first image data, the manifold being a two-dimensional array and wherein each pixel of the two-dimensional array includes a weighted depth value;

integrating the second image data into the TSDF further comprises:

updating the manifold based at least in part on a second depth frame of the second image data;

determining a threshold period has elapsed; and in response to the threshold period elapsing, integrating the weighted depth values of the manifold into the TSDF.

20. The non-transitory computer-readable media as recited in claim 18, wherein integrating the first image data into the TSDF further comprises:

receiving a first voxel block of a first size and a second voxel block of a second size, the second size coarser than the first size;

generating a super voxel block including at least the first voxel block and the second voxel block;

integrating adjacent voxel blocks of the super voxel block having the second size using one marching pyramid into a mesh;

integrating up to four adjacent voxel blocks of the first size with a share-plane of the super voxel block using four marching pyramids into the mesh;

integrating voxel blocks of the first size and voxel blocks of the second size sharing three edges within the super voxel block using two marching pyramids and one marching tetrahedral into the mesh;

integrating voxel blocks of the first size and voxel blocks of the second size sharing two edges within the super voxel block using three marching pyramids, two marching pyramids, and two marching tetrahedras into the mesh; and integrating voxel blocks of the first size and voxel blocks of the second size sharing one edges within the super voxel block using four marching pyramids into the mesh.

* * * * *